(12) United States Patent
Hiraguchi

(10) Patent No.: US 7,234,662 B2
(45) Date of Patent: Jun. 26, 2007

(54) RECORDING TAPE CARTRIDGE

(75) Inventor: Kazuo Hiraguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 351 days.

(21) Appl. No.: 11/063,895

(22) Filed: Feb. 24, 2005

(65) Prior Publication Data
US 2005/0184180 A1 Aug. 25, 2005

(30) Foreign Application Priority Data
Feb. 24, 2004 (JP) ............................... 2004-048568

(51) Int. Cl.
*G11B 23/04* (2006.01)
(52) U.S. Cl. .................................. 242/338.1; 242/348
(58) Field of Classification Search ............. 242/338.1, 242/348, 343, 343.1, 343.2; 360/132
See application file for complete search history.

(56) References Cited

U.S. PATENT DOCUMENTS

| 3,920,196 | A | 11/1975 | Tucker et al. |
| 4,014,042 | A | 3/1977 | Schoettle et al. |
| 4,033,523 | A | 7/1977 | Roman |
| 4,210,296 | A | 7/1980 | Frechette |
| 4,742,415 | A | 5/1988 | Oishi |
| 5,813,622 | A | 9/1998 | Von Alten |
| 5,901,916 | A | 5/1999 | McAllister et al. |
| 6,234,416 | B1* | 5/2001 | Nayak ..................... 242/338.1 |
| 6,318,657 | B1 | 11/2001 | Nayak |
| 6,452,747 | B1 | 9/2002 | Johnson et al. |
| 6,572,045 | B2* | 6/2003 | Blair et al. .................. 242/348 |
| 6,581,866 | B2* | 6/2003 | Tsuyuki et al. ............. 242/348 |
| 7,040,564 | B1 | 5/2006 | Veno et al. |
| 7,104,486 | B2 | 9/2006 | Hiraguchi |
| 2001/0026030 | A1 | 10/2001 | Morita et al. |
| 2002/0141087 | A1 | 10/2002 | Hiraguchi et al. |
| 2004/0026550 | A1* | 2/2004 | Hiraguchi et al. ....... 242/338.1 |
| 2005/0023400 | A1 | 2/2005 | Hiraguchi |
| 2005/0184179 | A1 | 8/2005 | Hiraguchi |
| 2005/0184181 | A1 | 8/2005 | Hiraguchi |
| 2005/0184182 | A1 | 8/2005 | Hiraguchi |
| 2005/0211813 | A1 | 9/2005 | Hiraguchi |

FOREIGN PATENT DOCUMENTS

EP 0 347 947 A2 12/1989

(Continued)

*Primary Examiner*—William A. Rivera
(74) *Attorney, Agent, or Firm*—Sughrue Mion, PLLC

(57) ABSTRACT

A recording-tape cartridge including a case accommodating a reel; a mounting portion formed at the case, at which guide-wall portions and locking members capable of positioning at vertical-movement-locking-position and vertical-movement-allowing-position are provided; a switching member for switching the locking members between the vertical-movement-locking-position and the vertical-movement-allowing-position, guide portions inserted between the guide wall portions to guide the switching member; an urging-member; and a disengagement-prevention-member, in which draft angles of the guide portions and the guide-wall portions ≧0.5°, respectively, and at the vertical movement-allowing-position, a clearance between a tip outside-surface of the guide portion and an inside-surface of the guide wall portion≧a clearance between a tip inside-surface of the guide wall portion and the outside-surface of the guide portion, and the maximum clearance is set between 0.05-0.3 mm, the locking members contacting the switching member only in the reel-radial direction by the urging-member, is provided.

4 Claims, 21 Drawing Sheets

FOREIGN PATENT DOCUMENTS

| | | |
|---|---|---|
| EP | 0 488 387 A1 | 6/1992 |
| EP | 1 098 321 A1 | 5/2001 |
| JP | 5-258524 A | 10/1993 |
| JP | 7-161166 A | 6/1995 |
| JP | 11-39833 A | 2/1999 |
| WO | WO 98/44506 A2 | 10/1998 |

\* cited by examiner

RECORDING TAPE CARTRIDGE

CROSS-REFERENCE TO RELATED APPLICATION

This application claims priority under 35 USC 119 from Japanese Patent Application No. 2004-048568, the disclosures of which are incorporated by reference herein.

BACKGROUND OF THE INVENTION

1. Field of the Invention

The present invention relates to a recording tape cartridge which accommodates, in a case, a single reel onto which recording tape such as a magnetic tape or the like is wound, principally for use as a recording/replaying medium for computers and the like.

2. Description of the Related Art

A recording tape cartridge at which a magnetic tape or the like, which is used as a data recording/replaying medium for computers or the like, is wound onto a single reel and this reel is rotatably accommodated in a case made of synthetic resin has been well known hitherto. At a time of use of such a recording tape cartridge (when the cartridge is loaded in a drive device), the reel is rotatable in the case, and at a time of non-use (when the cartridge is not loaded in a drive device), the reel is locked so as to be non-rotatable in the case.

Specifically, such a recording tape cartridge is equipped with a brake mechanism such that the reel does not rotate in the case at times of non-use. Structures in which, for example, a brake member which is non-rotatable with respect to a case is engaged with a reel and suchlike have been considered.

For example, as shown in FIG. 21, a brake member 130 is formed in a circular plate form which is accommodated in a reel hub 112 of a reel 110. The reel hub 112 has the form of a circular tube with a base. The brake member 130 can move up and down in the reel hub 112. A pair of engaging protrusions 134, which are formed substantially in 'U' shapes in plan view, are provided standing from an upper face of the brake member 130. A pair of rotation-limiting ribs 126, which protrude down from an inner face of an upper case 122, are inserted into the engaging protrusions 134 and render the brake member 130 non-rotatable with respect to a case 120.

This brake member 130 is continuously urged toward a base wall 114 of the reel hub 112 by an urging member, such as a compression coil spring 116 or the like. Thus, an annular braking gear 132, which is formed at a lower face of the brake member 130, meshes with an annular engaging gear 118, which is formed at an upper face of the base wall 114 of the reel hub 112. As a result, undesired rotation of the reel 110 is prevented.

Further, a circular column-form operation protrusion 136 is provided protruding from a central portion of a lower face of this brake member 130. The operation protrusion 136 is inserted into a through-hole 114A, which is formed through a central portion of the base wall 114 of the reel hub 112, and opposes a gear aperture 128, which is formed at a substantially central portion of a lower case 124. Accordingly, when the reel 110 is to be rendered rotatable, the operation protrusion 136 (and thus the brake member 130) is pushed upward and the meshing of the braking gear 132 with the engaging gear 118 is released (see, for example, the specification of U.S. Pat. No. 6,452,747).

However, with this kind of structure, at times of non-use of the recording tape cartridge, it is possible for the reel 110 to be lifted in opposition to the urging force of the urging member such as the compression coil spring 116 or the like (i.e., the reel 110 is movable in an axial direction thereof). In consequence, if the base wall 114 of the reel hub 112 is moved upward due to impact being applied to the recording tape cartridge due to falling or the like, the brake member 130 may get caught up on a peripheral edge portion of the through-hole 114A (i.e., be tipped up) in an inclined state, as shown in FIG. 21.

If the recording tape cartridge is loaded into a drive device in such a state, there is a problem in that, as well as recording and replaying not being possible, damage to the recording tape cartridge and/or malfunctioning of the drive device may result. Furthermore, because the reel is rotatable at times of non-use, there is a problem in that adverse effects such as the recording tape becoming creased or broken may occur. Further yet, a gap between an upper flange and a lower flange of the reel is set to be substantially equal to the width of the recording tape. Therefore, there is a problem in that if the reel is shaken in the case by falling (dropping) or the like, outer peripheral edges of the upper flange and/or the lower flange may come into contact with inner faces of the case and be deformed, and adverse effects such as twisting or the like of the recording tape will result.

Accordingly, provision, at an inner face of a ceiling plate of a case, of a locking mechanism which prevents lifting of a reel such that the reel cannot be lifted (i.e., is not movable in the axial direction) at times of non-use of a recording tape cartridge has been considered. However, in many such locking mechanisms, an urging member such as a spring or the like is provided, and urging force from this urging member may, via a braking member, cause adverse effects to a rotation shaft of a drive device.

Specifically, because the brake member is continuously urged downward by urging force of the compression coil spring, the urging member of the locking mechanism generates a force component in the downward direction, and urging force on the brake member may be increased. Accordingly, when the urging force on the brake member is increased, because the rotation shaft of the drive device lifts the brake member against this urging force and causes the reel to rotate, an excess load corresponding to this increase is applied to the rotating shaft. Thus, there has been a problem in that it has been difficult to stably rotate the reel.

SUMMARY OF THE INVENTION

Accordingly, the present invention will provide a recording tape cartridge at which, in a case in which a locking mechanism or the like that includes another urging member is provided, urging force from this urging member will not be transmitted to a rotation shaft of a drive device during rotation of a reel.

An aspect of the present invention is a recording tape cartridge including: a case accommodating a reel on which a recording tape is wound; a mounting portion formed at an inner face of a ceiling plate of the case, at which sets of two of the guide wall portions are provided in protruding manner; a locking member provided to be slideable in a radial direction of the reel at the mounting portion, the locking member being capable of positioning at a vertical movement-locking position, at which the locking member is interposed between an upper face of the reel and the ceiling plate for blocking movement of the reel in an axial direction of the reel, and a vertical movement-allowing position, at which the locking member is withdrawn from between the upper face of the reel and the ceiling plate for allowing movement of the reel in the axial direction; a switching member which is moved in the axial direction of the reel by a rotation shaft of a drive device, for switching the locking member between the vertical movement-locking position and the vertical movement-allowing position; guide portions provided in protruding manner at the switching member, each of the guide portions being inserted between the respective guide wall portions so as to guide movement of the switching member; an urging member which urges the locking member in the radial direction of the reel; and a disengagement prevention member which retains the locking member such that the locking member does not disengage from the mounting portion, wherein draft angles for removing from dies, of surfaces of the guide portions and surfaces of the guide wall portions, which face each other, are greater than or equal to 0.5°, respectively, and at the vertical movement-allowing position, a clearance between an outside surface of the guide portion at a tip end side thereof and an inside surface of the guide wall portion is larger than or equal to a clearance between the inside surface of the guide wall portion at a tip end side thereof and the outside surface of the guide portion, and the maximum clearance between the outside surface of the guide portion and the inside surface of the guide wall portion is set between 0.05 mm and 0.3 mm, and the locking member contacting the switching member only in the radial direction of the reel by the urging member.

In the aspect, at the vertical movement-allowing (ascent/descent-allowing) position, the locking member is abutted against the switching member by urging force of the urging member only in the radial direction of the reel. Therefore, this urging force of the urging member acts only in the radial direction of the reel, and will not be transmitted in the axial direction of the reel. Further, draft angles for removing from dies, of surfaces of the guide portions and surfaces of the guide wall portions, which face each other, are greater than or equal to 0.5°, respectively, and at the vertical movement-allowing position, a clearance between an outside surface of the guide portion at a tip end side thereof and an inside surface of the guide wall portion is larger than or equal to a clearance between the inside surface of the guide wall portion at a tip end side thereof and the outside surface of the guide portion, and the maximum clearance between the outside surface of the guide portion and the inside surface of the guide wall portion is set between 0.05 mm and 0.3 mm. Accordingly, a problem in which the switching member is tilted slantingly will not occur. Therefore, at times of rotation of the reel, a problem in which loading on the rotation shaft of the drive device (loading in the axial direction of the reel) is increased will not occur. In consequence, the reel can be stably rotated.

Another aspect of the present invention is a recording tape cartridge including: a case accommodating a reel on which a recording tape is wound; a mounting portion formed at an inner face of a ceiling plate of the case, at which sets of two of the guide wall portions are provided in protruding manner; a locking member provided to be slideable in a radial direction of the reel at the mounting portion, the locking member being capable of positioning at a vertical movement-locking position for blocking movement of the reel in an axial direction of the reel and a vertical movement-allowing position for allowing movement of the reel in the axial direction, a cam portion being formed at a position which is in a vicinity of an inner end, in the radial direction of the reel, of the locking member; a switching member which is moved in the axial direction of the reel by a rotation shaft of a drive device, for switching the locking member between the vertical movement-locking position and the vertical movement-allowing position, a protrusion being formed at an upper surface of the switching member; guide portions provided in protruding manner at the switching member, each of the guide portions being inserted between the respective guide wall portions so as to guide movement of the switching member; an urging member which abuts against and pushes outwardly in the radial direction of the reel an inner side face, in the radial direction of the reel, of the cam portion so as to urge the locking member; and a disengagement prevention member which retains the locking member such that the locking member does not disengage from the mounting portion, wherein, draft angles for removing from dies, of surfaces of the guide portions and surfaces of the guide wall portions, which face each other, are greater than or equal to 0.5°, respectively, and at the vertical movement-allowing position, a clearance between an outside surface of the guide portion at a tip end side thereof and an inside surface of the guide wall portion is larger than or equal to a clearance between the inside surface of the guide wall portion at a tip end side thereof and the outside surface of the guide portion, and the maximum clearance between the outside surface of the guide portion and the inside surface of the guide wall portion is set between 0.05 mm and 0.3 mm, and the locking member is capable of positioning at the vertical movement-locking position, at which an outer end, in the radial direction of the reel, of the locking member is interposed between an upper face of the reel and the ceiling plate, and at the vertical movement-allowing position, at which the outer end, in the radial direction of the reel, of the locking member is withdrawn from between the upper face of the reel and the ceiling plate and the cam portion is moved inward, in the radial direction of the reel, with respect to the protrusion, and when the locking member is at the vertical movement-allowing position, an outer side face, in the radial direction of the reel, of the cam portion abuts against an inner side face, in the radial direction of the reel, of the protrusion only in the radial direction of the reel.

As described above, according to the present invention, it is possible to provide a recording tape cartridge at which, in a case in which a locking mechanism or the like that includes a dedicated urging member is provided, urging force from this urging member will not be transmitted to a rotation shaft of a drive device at times of rotation of a reel.

BRIEF DESCRIPTION OF THE DRAWINGS

Embodiments of the invention will be described in detail with reference to the following figures, wherein.

DETAILED DESCRIPTION OF THE INVENTION

Figure 1:
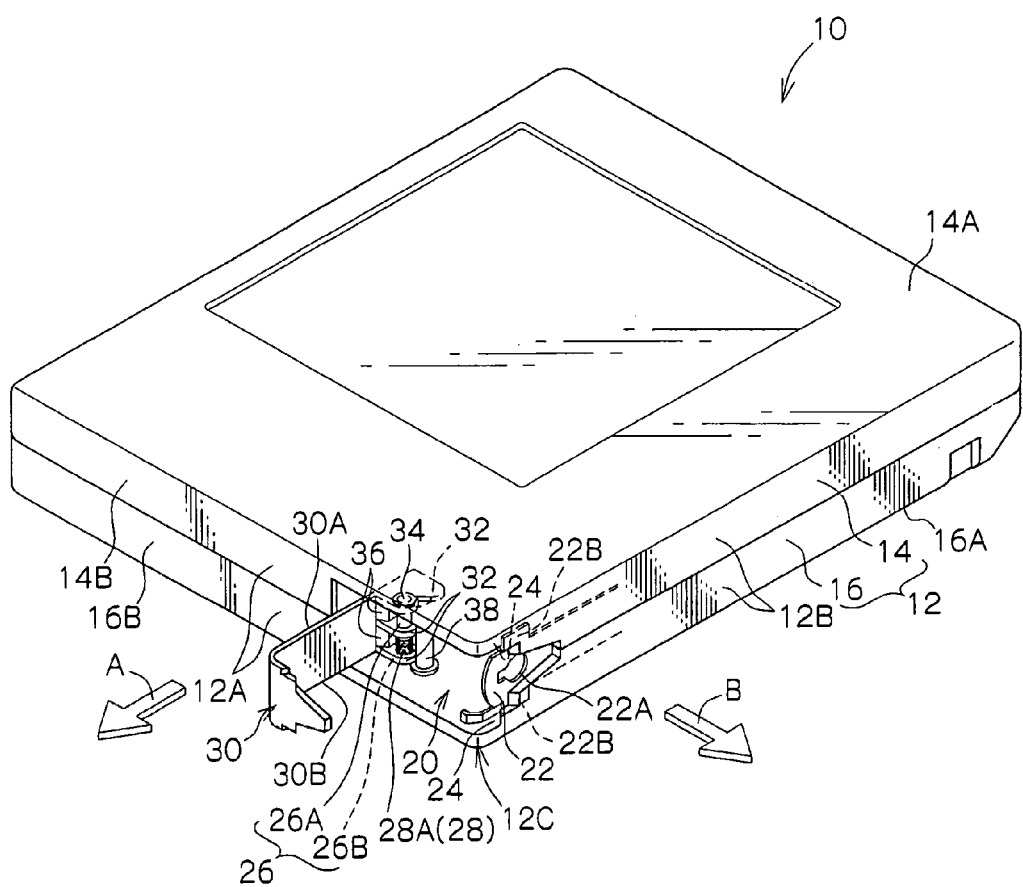
FIG. 1 is a schematic perspective view of a recording tape cartridge.

Below, an embodiment of the present invention will be described in detail on the basis of an example shown in the drawings. Note that, for the sake of convenience of explanation, a direction of loading of a recording tape cartridge into a drive device is represented by arrow A, and is considered to be a forward direction. Further, arrow B is a leftward direction, and front, rear, left, right, up and down are expressed with reference to these directions. Further still, where radial directions are referred to herebelow, this indicates directions parallel to directions bearing radially outward from an axial (center) line of a reel accommodated in a case.

As shown in FIG. 1, a recording tape cartridge 10 includes a substantially rectangular box-form case 12. This case 12 is structured by joining together an upper case 14 and a lower case 16. At the upper case 14, a peripheral wall 14B is provided standing along peripheral edges of a ceiling plate 14A, and at the lower case 16, a peripheral wall 16B is provided standing along peripheral edges of a floor plate 16A. The case 12 is formed by, in a state in which the peripheral wall 14B and the peripheral wall 16B are matched with one another, joining the upper case 14 with the lower case 16 by ultrasonic welding, fixing with screws or the like.

Figure 2:
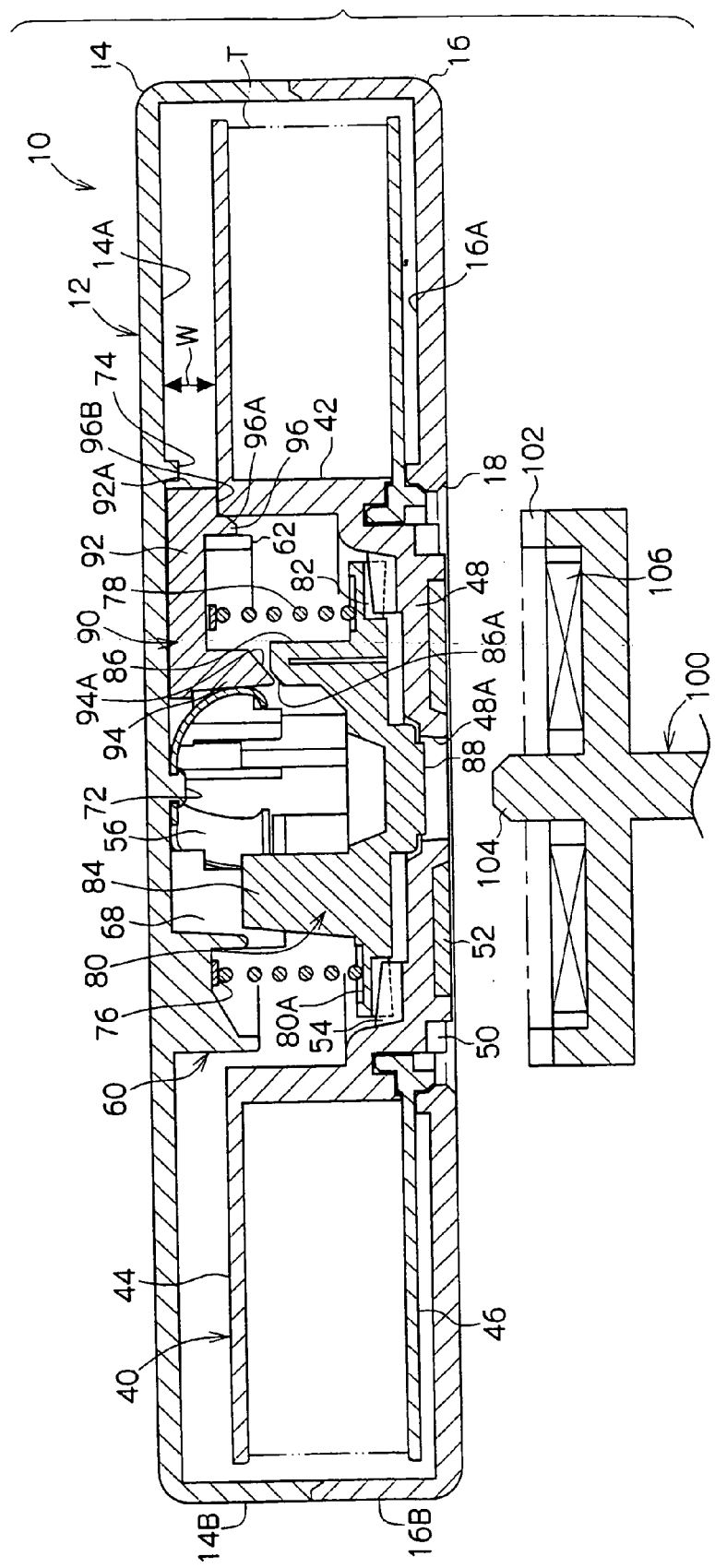
FIG. 2 is a schematic side sectional view of the recording tape cartridge prior to raising of a rotation shaft.
Figure 3:
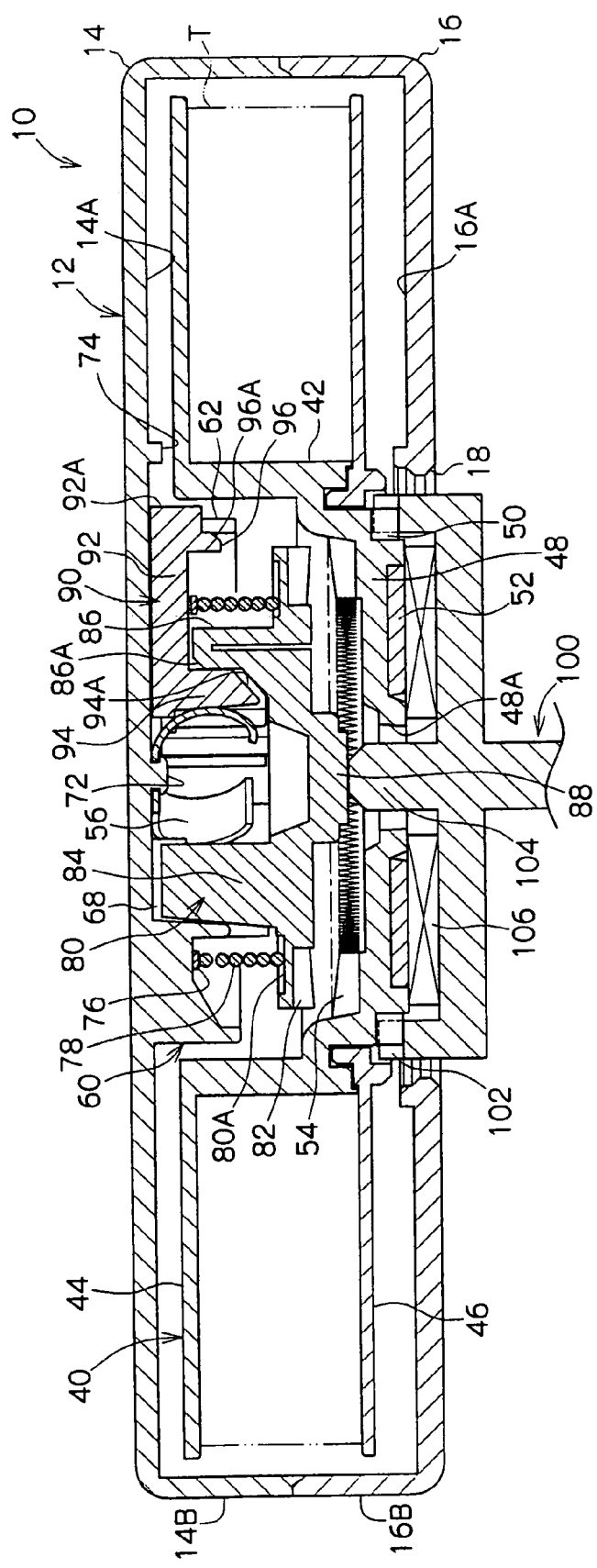
FIG. 3 is a schematic side sectional view of the recording tape cartridge subsequent to the raising of the rotation shaft.

A reel 40 is singly and rotatably accommodated inside the case 12. As shown in FIGS. 2 and 3, this reel 40 is structured by integrally forming a reel hub 42 and an upper flange 44, and ultrasonically welding a lower flange 46 to a lower end portion of the reel hub 42. The reel hub 42 has the form of a circular tube with a base and structures a central portion of the reel 40. The upper flange 44 is provided at an upper end portion of the reel hub 42. A recording tape T, such as a magnetic tape which serves as an information recording/replaying medium or the like, is wound round at an outer peripheral face of this reel hub 42. Width direction end portions of the thus wound recording tape T are retained by the upper flange 44 and the lower flange 46.

As shown in FIG. 1, an opening 20 is formed in a vicinity of a front-left corner portion 12C of the recording tape cartridge 10. The opening 20 is for drawing-out of the recording tape T, which is wound onto the reel 40, to the outside. Specifically, the opening 20 is formed to extend between a front wall 12A and a left side wall 12B, which adjoin at the corner portion 12C. A leader tape 22, which is fixed to an end portion of the recording tape T and arranged along the left side wall 12B, is drawn out from the opening 20.

Now, corner portions mentioned herein refer to corner line portions at which the peripheral walls 14B and 16B of the substantially rectangular box-form case 12 intersect at a substantial right angle or an obtuse angle in plan view. Accordingly, the corner portion 12C refers to a corner line portion at which the front wall 12A and the left side wall 12B intersect substantially at a right angle in plan view.

The leader tape 22 is a drawn-out member with which a drawing-out member (not shown) of a drive device engages for drawing out the recording tape T. A hole portion 22A, at which the drawing-out member engages, is formed through a distal end vicinity of the leader tape 22. At both upper and lower sides of this hole portion 22A, slightly to the rearward relative to a leading end of the hole portion 22A, projecting portions 22B are formed to project upward and downward, respectively. Accommodating recess portions 24 are formed at an inner face of the upper case 14 and an inner face of the lower case 16, respectively. The leader tape 22 is retained in the case 12 by the projecting portions 22B being accommodated (inserted) in the accommodating recess portions 24.

At times of non-use of the recording tape cartridge 10, the opening 20 is closed off by a door 30. This door 30 is formed in a substantial 'L' shape in plan view, with shape and size substantially the same as the opening 20. Here, this door 30 is preferably formed of an olefin-type resin, such as POM or the like, but can be formed of a resin such as PC or the like, a metal such as SUS or the like, or the like.

A support shaft 26, which acts as a support point for rotation of the door 30, is provided protruding at the front wall 12A side of, respectively, the upper case 14 and the lower case 16. The upper case 14 side of the support shaft 26 is a circular tube-form boss 26A, and the lower case 16 side of the support shaft 26 is a circular column-form boss 26B. The support shaft 26 is structured by a distal end (upper end) of the lower case 16 side boss 26B being fitted into the upper case 14 side boss 26A. Accordingly, a radius of the boss 26B is slightly smaller than a radius of the boss 26A.

Three flat plate-form rotation and sliding portions 32 are provided protruding in parallel at a vicinity of a right end portion of an-inner face of the door 30 (i.e., a position offset to leftward by a predetermined distance from the right end portion). These rotation and sliding portions 32 are provided protruding from both upper and lower end portions of the inner face of the door 30, and from an intermediate portion of the inner face of the door 30 which is offset slightly downward from the middle of the inner face of the door 30. A through-hole which fits loosely round the support shaft 26 is formed through each rotation and sliding portion 32. Thus, the door 30 is rotatably supported by the support shaft 26 passing through the through-holes.

Annular protrusion portions 34 are formed around the through-holes, at an upper face of the rotation and sliding portion 32 at the upper end portion and at a lower face of the rotation and sliding portion 32 at the lower end portion. These annular protrusion portions 34 are in contact with the upper case 14 and the lower case 16, respectively. As a result, gaps of around 0.3 mm to 0.5 mm are respectively formed between an upper end face 30A of the door 30 and the upper case 14 and between a lower end face 30B of the door 30 and the lower case 16.

A protuberance portion 36, which has a circular arc form running along a peripheral surface of the support shaft 26 in sectional plan view, is each formed at the inner face of the door 30, between the rotation and sliding portions 32.

A torsion spring 28 urges the door 30 in a direction for closing off the opening 20. A coil portion 28A of this torsion spring 28 is fitted round the support shaft 26. That is, the coil portion 28A of the torsion spring 28 is fitted round and assembled to the boss 26B, whose diameter is smaller, in a state in which the coil portion 28A is retained between the lower end portion rotation and sliding portion 32 and the intermediate portion rotation and sliding portion 32. One end portion side of the torsion spring 28 is engaged with a screw boss 38 of the case 12 (a screw boss provided protruding from the lower case 16), and the other end portion side of the torsion spring 28 is engaged with a right side edge portion of the protuberance portion 36.

Meanwhile, the reel 40 is formed of a resin material. As mentioned earlier, the reel 40 is structured by the reel hub 42, the upper flange 44 and the lower flange 46, with the reel hub 42 having the form of a tube with a base, the upper flange 44 being integrally provided extending from an upper end portion of the reel hub 42, and the lower flange 46 being attached to a lower end portion of the reel hub 42 by welding or the like. Accordingly, the reel hub 42 and the lower flange 46 are formed using resin materials which are compatible with one another, and can be easily welded with ultrasonic waves or the like. Furthermore, the spacing between the upper flange 44 and the lower flange 46 is made substantially equal to the width of the recording tape T, so as to regulate a width direction position of the recording tape T that has been wound round the reel hub 42.

Further, as shown in FIGS. 2 and 3, a base wall 48 is provided at the lower flange 46 side of the reel hub 42. A through-hole 48A is formed through an axial (central) portion of this base wall 48, and a reel gear 50 is formed in an annular shape at a lower face side of this base wall 48. A circular gear aperture 18 is formed substantially at the middle of the lower case 16. A drive gear 102 is provided at a rotation shaft 100 at a drive device. When the reel 40 is pushed to the lower case 16 side by urging force from a compression coil spring 78, the reel gear 50 is exposed through the gear aperture 18, the reel gear 50 meshes with the drive gear 102, and rotation force can be transmitted to the reel 40.

An annular reel plate 52 formed of a magnetic material is integrally fixed at a radial direction inner side of the reel gear 50, by insert-molding or the like. In a state in which the drive gear 102 and the reel gear 50 are fully meshed, this reel plate 52 is attracted and adhered by magnetic force of an annular magnet 106, which is provided between the drive gear 102 and a release protrusion 104, which is described later. Thus, the reel plate 52 prevents offsetting of axes of the reel 40 and the rotation shaft 100, and enables maintenance of the reel gear 50 and the drive gear 102 in the meshed state. With this structure, when the rotation shaft 100 rotates about its own axis, the reel 40 rotates integrally therewith inside the case 12.

Figure 4:
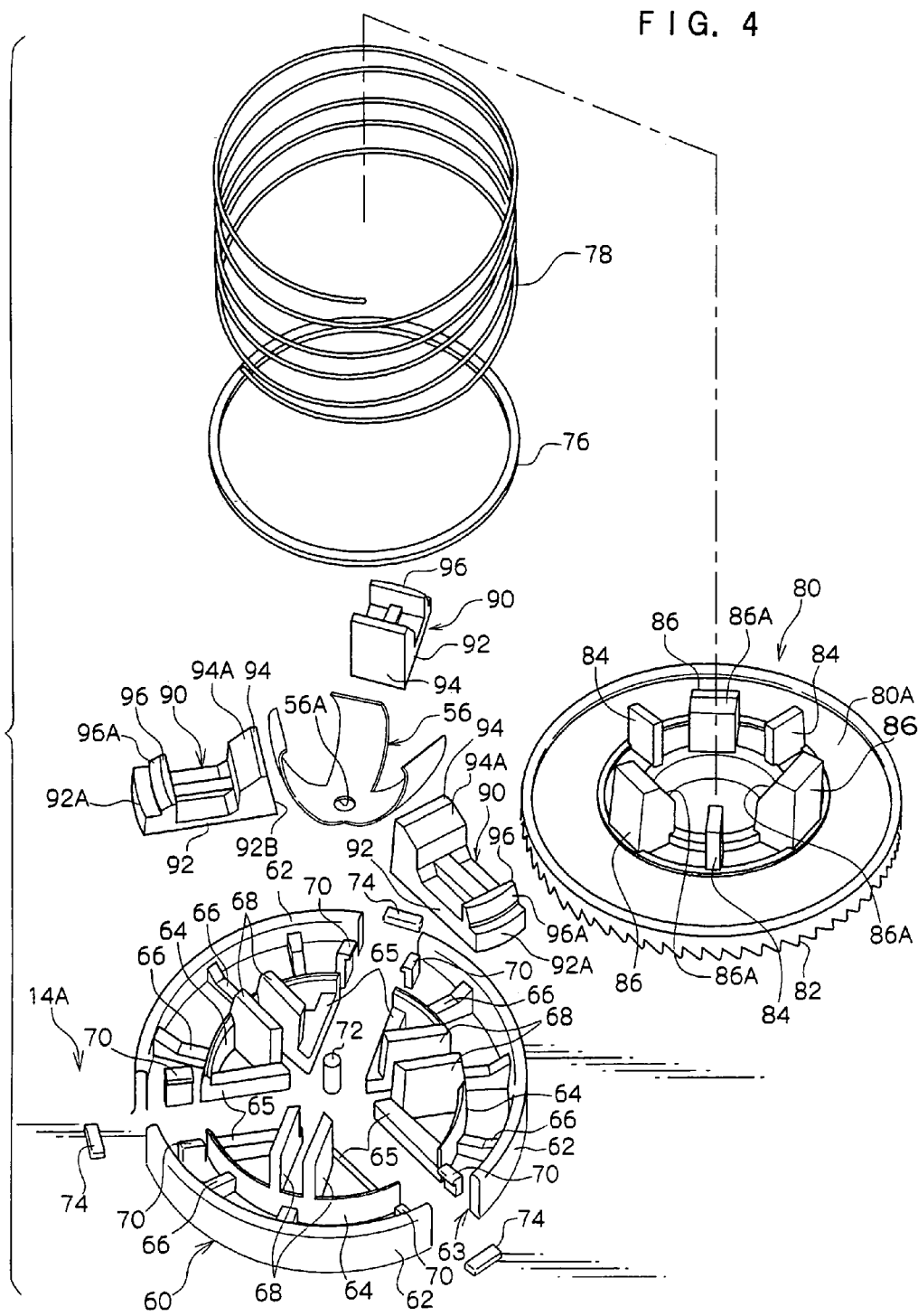
FIG. 4 is a schematic exploded perspective view showing structure of a mounting portion formed at an upper case.

An engaging gear 54 is formed in an annular shape at an upper face side of the base wall 48 of the reel hub 42. The engaging gear 54 can mesh with a braking gear 82 of a brake member 80. As shown in FIG. 4, this brake member 80 is formed in a circular plate shape which is accommodated to be vertically movable inside the reel hub 42 (i.e., movable in the axial direction of the reel 40), and the braking gear 82 is formed in an annular shape at an outer peripheral portion of a lower face of the brake member 80.

Plural plate-form guide portions 84 (three in the present embodiment) and plural (three in the present embodiment) substantially square column-form engaging protrusions 86 are alternately provided standing from the upper face of the brake member 80, at respectively equal intervals. Each of the guide portions 84 is to be inserted between guide wall portions 68 of the upper case 14 (which are described later). The engaging protrusions 86 are to respectively engage with cam portions 94 of plural (three in the present embodiment) locking members 90 (which are described later). Radial direction inner sides of these engaging protrusions 86 are formed as taper surfaces 86A, which are inclined at 30° to 60°, preferably 45°. These taper surfaces 86A engage with taper surfaces 94A, which are formed at the cam portions 94 of the locking members 90.

A flat surface 80A is formed in an annular shape at the upper face of the brake member 80, at the outer side of the guide portions 84 and the engaging protrusions 86. When the recording tape cartridge 10 (the case 12) has been assembled, a lower end of the compression coil spring 78 abuts against the flat surface 80A. A substantially circular column-form operation protrusion 88, which is insertable through the through-hole 48A, is provided protruding from the middle of the lower face of the brake member 80. The operation protrusion 88 is abuttable against the release protrusion 104, which is protrudingly provided at an axial center portion of the drive device side rotation shaft 100 (see FIGS. 2 and 3). Here, this operation protrusion 88 is protruded to a length so as not to protrude downward through the through-hole 48A (from the base wall 48), i.e., to a length so as to be disposed within the through-hole 48A. Thus, inadvertent upward movement of the brake member 80 is avoided.

Figure 18:
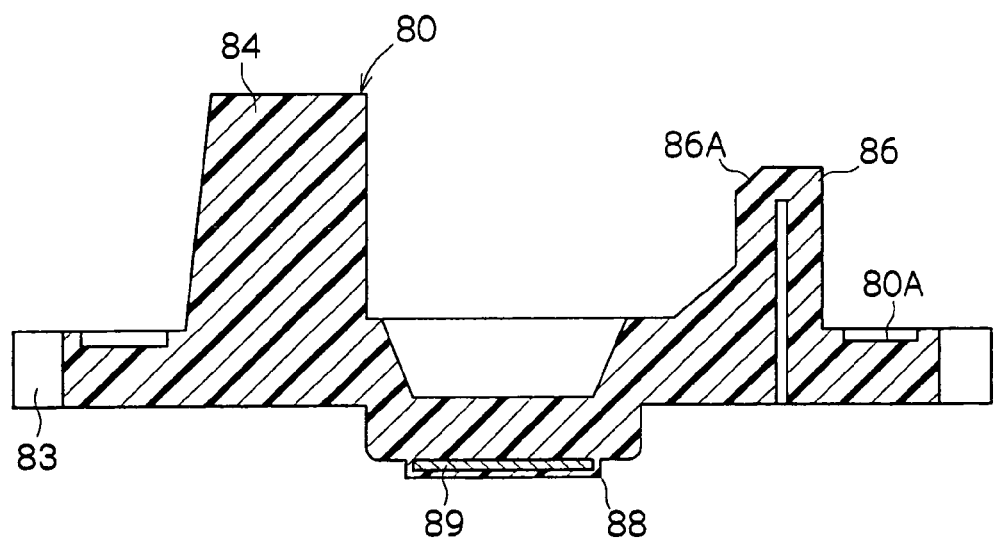
FIG. 18 is a schematic side sectional view of a brake member at which a braking gear is formed as a horizontal-type gear.

As shown in FIG. 18, this operation protrusion 88 is further provided with a metallic piece 89 embedded thereinside. This metallic piece 89 is provided integrally with the brake member 80, by insert-molding, resin-coating with POM, PE or the like, or the like, so as to be disposed at a depth of around 0.2 to 0.8 mm from a surface of the operation protrusion 88. The metallic piece 89 improves strength (stiffness) of the operation protrusion 88. Thus, this structure suppresses abrasion of the operation protrusion 88 caused by rubbing against the release protrusion 104 of the rotation shaft 100 during rotation of the reel 40. As a result, with this structure, the release protrusion 104 can always be accurately abutted against the operation protrusion 88 (and reliably pushes the operation protrusion 88 up to a rotation-allowing position).

Here, with regard to suppressing abrasion, a structure in which a resin piece having a hardness comparable to metal is embedded is also possible. However, embedding the metallic piece 89 is more preferable because the metallic piece 89 can more effectively (efficiently) dissipate friction heat generated at the operation protrusion 88. A material of this metallic piece 89 may be anything such as aluminium, copper or the like but, with regard to heat dissipation, a metal with a high thermal conductivity is preferable.

Figure 5:
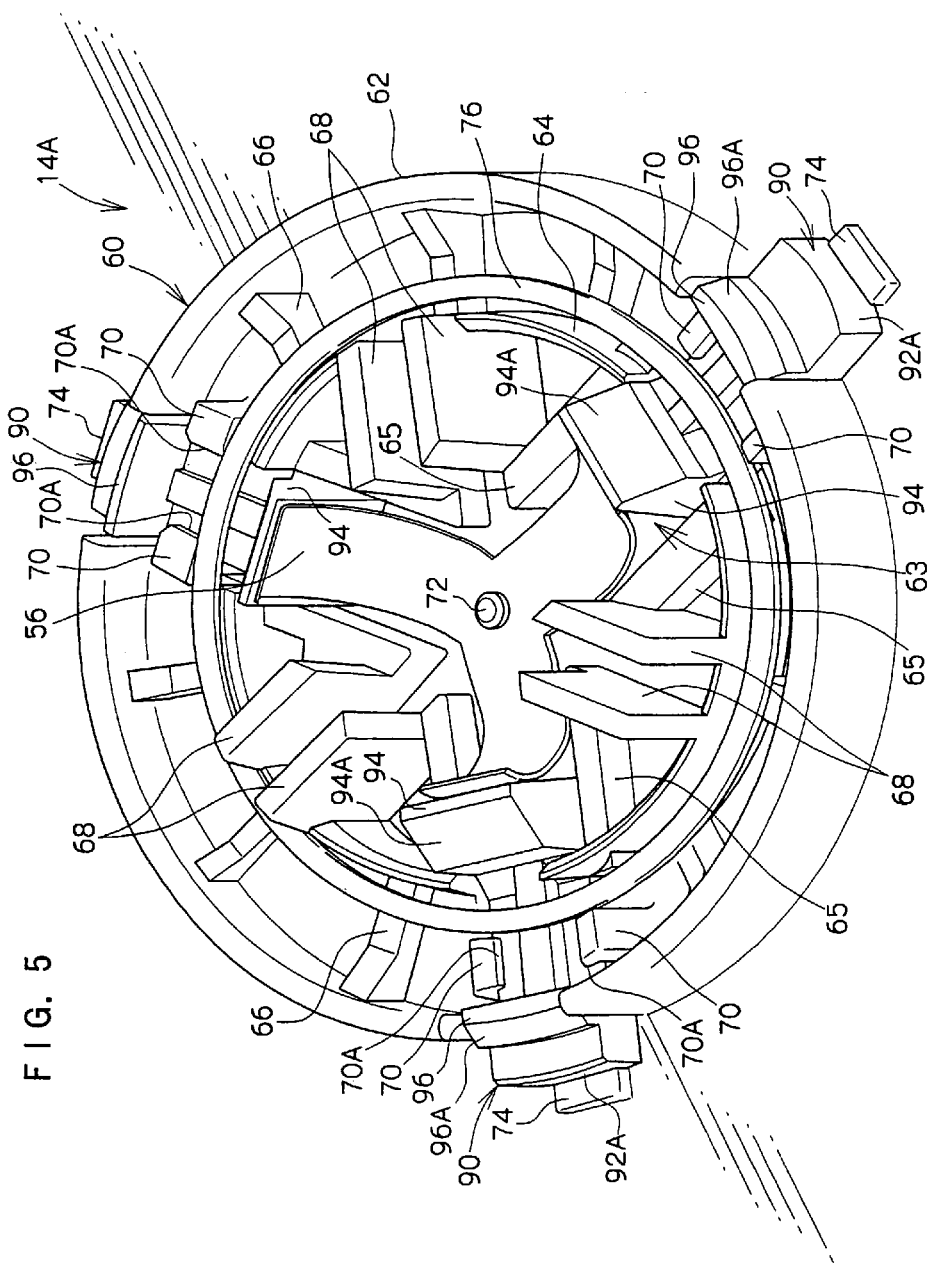
FIG. 5 is a schematic perspective view showing the mounting portion formed at the upper case.

As shown in FIGS. 4 and 5, a mounting portion 60 is formed substantially at the middle of the inner face of the ceiling plate 14A of the upper case 14 (above an axial central portion of the reel hub 42). The mounting portion 60 slideably accommodates the plural (three) locking members 90 and the like, which engage with an upper end portion of the reel hub 42 from an inner peripheral face side thereof and block movement of the reel 40 in the axial direction thereof (the vertical direction). This mounting portion 60 stands in a concentric circular form in plan view, including two tubular walls 62 and 64, the outer of which is taller than the inner. These tubular walls 62 and 64 are cut away at suitable positions (three equidistant locations). At these cut-away portions, guide ribs 65 are provided standing along radial directions at the inner side of the tubular wall 64. Hence, the locking members 90 are accommodated in accommodation portions 63, which are formed between these guide ribs 65, and the locking members 90 can be slid in radial directions.

Plural (nine in the present embodiment) plate-form support ribs 66 are provided standing along radial directions between the tubular walls 62 and 64, so as to connect the tubular walls 62 and 64 with one another. A number of sets of two of the guide wall portions 68 equal to the number of the guide portions 84, is provided protruding between the accommodation portions 63 at the inner side of the tubular wall 64. The guide portions 84 of the brake member 80 are inserted between the guide wall portions 68. As shown in FIGS. 4 and 5, these sets of two guide wall portions 68 are provided substantially along radial directions such that outer end faces thereof are coplanar with an outer peripheral face of the tubular wall 64. At each set of guide wall portions 68, a protrusion spacing therebetween is set to be slightly larger than a plate thickness of the guide portions 84.

Concretely, at least, draft angles for drawing from dies (molds) of outside surfaces of the guide portions 84 and inside surfaces of the guide wall portions 68, which face each other, are greater than or equal to 0.5°, respectively. Further, at a time in which the brake member 80 moves upward, a clearance between the outside surface of the guide portion 84 at a tip end side thereof and the inside surface of the guide wall portion 68 is larger than or equal to a clearance between the inside surface of the guide wall portion 68 at a tip end side thereof and the outside surface of the guide portion 84, further, the maximum clearance between one of the inside surfaces of the two guide wall portions 68 (the two guide wall portions 68 define one set of the guide wall portion) and one of the outside surfaces of the one guide portion 84 which is entered between the two guide wall portions 68, is set between 0.05 mm and 0.3 mm.

Here, the draft angles for drawing from dies of outside surface of the guide portion 84 and inside surface of the guide wall portion 68, which face each other, are greater than or equal to 0.5°, respectively, for the following reason. A height of the guide portion 84 and a height of the guide wall portion 68 are set more than or equal to 4.0 mm, respectively. In a case of the height of the guide portion 84 and the height of the guide wall portion 68, it is difficult to mold these if the draft angles are not set greater than or equal to 0.5°. Further, it is possible that the draft angles of the guide portion 84 and of the guide wall portion 68 are different.

Further, in a case in which the draft angles of the guide portion 84 and of the guide wall portion 68 are different, the clearance between the outside surface of the guide portion 84 at the tip end side thereof and the inside surface of the guide wall portion 68, and the clearance between the inside surface of the guide wall portion 68 at the tip end side thereof and the outside surface of the guide portion 84 are different at a time in which the brake member 80 moves upward. However, the clearance between the outside surface of the guide portion 84 and the inside surface of the guide wall portion 68 does not become less than 0.05 mm. That is, in a case in which the clearance becomes less than 0.05 mm, it may occur that the guide portion 84 cannot be inserted between the guide wall portions 68 due to molding variation and the like. It does not occur at a point of designing.

Further, in a case in which the clearance between the outside surface of the guide portion 84 and the inside surface of the guide wall portion 68 is more than 0.3 mm, the engaging protrusion 86 (the brake member 80) engaging with a cam portion 94 (mentioned later) of the locking member 90 is tilted due to clearance between the braking gear 82 and the engaging gear 54, and when the brake member 80 is moved upward further in this state, there has been a problem in that, with respect to the engaging protrusion 86, a force component which cannot be neglected, in axial direction of the reel 40 (vertical directions), is generated.

When such the force component is generated, a force received by the brake member 80, between the brake member 80 and the rotation shaft 100, becomes more than or equal to 0.5 N. This may cause wearing of the operation protrusion 88 against which the release protrusion 104 abuts. Accordingly, as described above, the maximum clearance between one of the inside surfaces of the two guide wall portions 68 (the two guide wall portions 68 define one set of the guide wall portion) and one of the outside surfaces of the one guide portion 84 which is entered between the two guide wall portions 68, is set between 0.05 mm and 0.3 mm.

Figure 6:
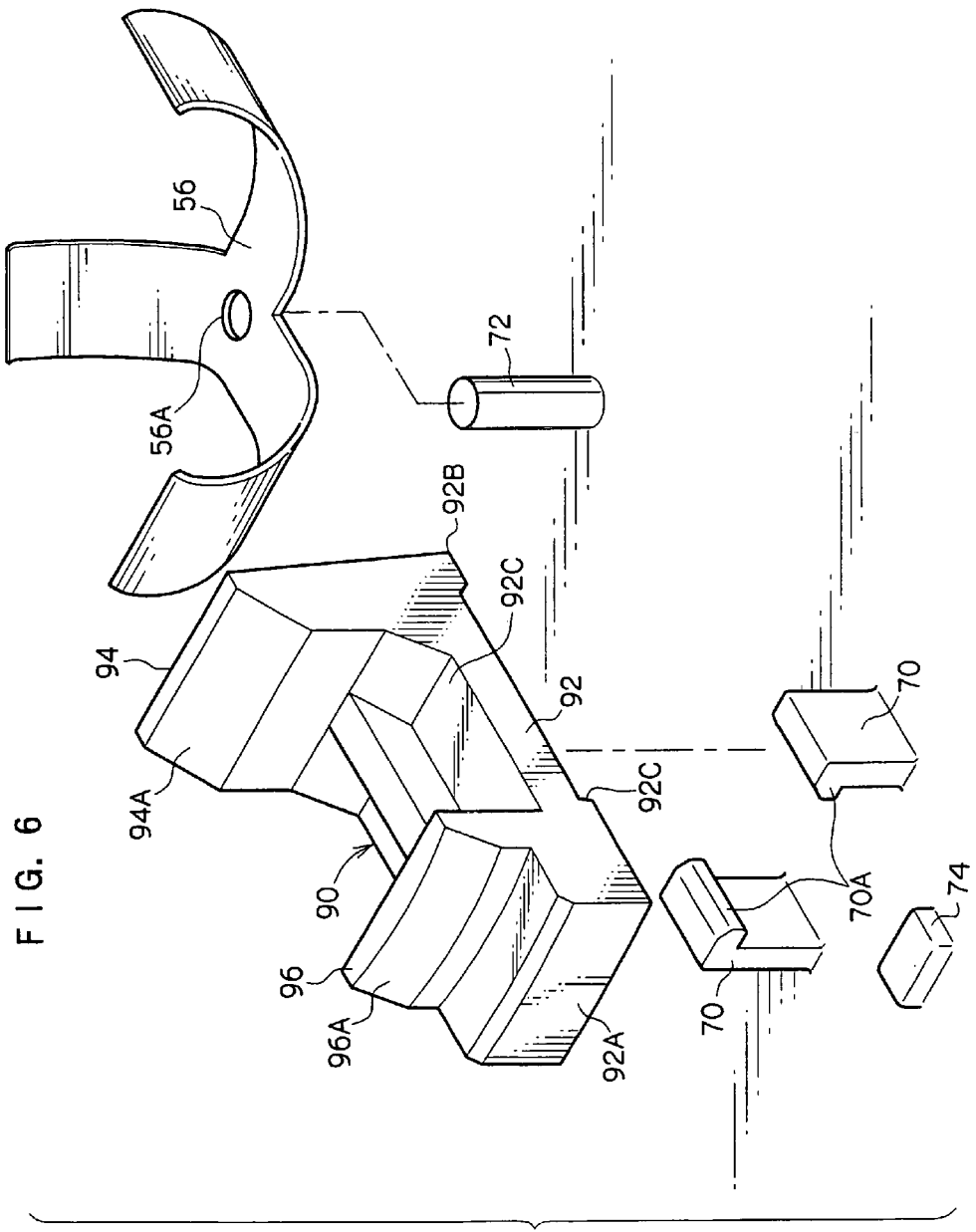
FIG. 6 is a schematic perspective view showing how a locking member and a plate spring are installed.
Figure 7:
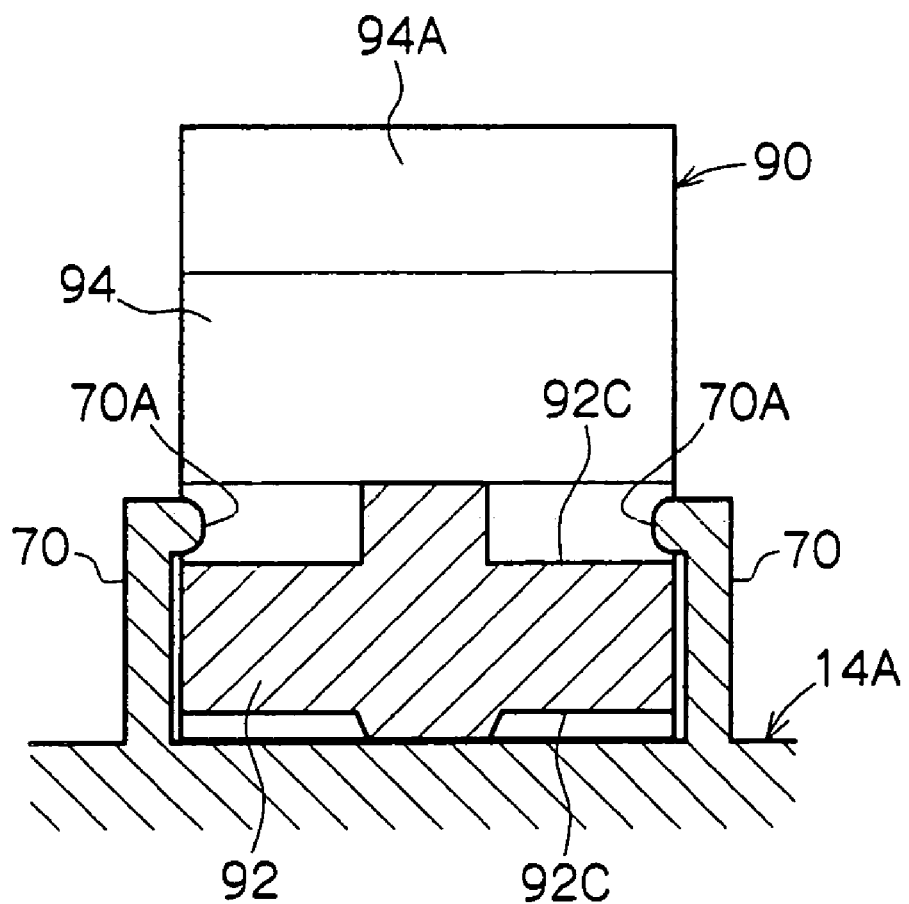
FIG. 7 is a schematic sectional view of the locking member being retained at retaining portions.

Pairs of retaining portions 70 are provided protruding at both sides of each accommodation portion 63, between the tubular walls 62 and 64, (on lines extended from the guide ribs 65). The retaining portions 70 slideably retain the locking members 90 (with small gaps therebetween). As shown in FIGS. 6 and 7, undercut portions 70A are formed at distal ends (lower ends) of these retaining portions 70, to serve as protrusion portions which stick out to mutual inner sides thereof (the locking member 90 sides thereof). When the locking members 90 have been installed, the locking members 90 are provisionally restrained somewhat by these undercut portions 70A so as not to fall (detach) from the mounting portion 60 (i.e., the accommodation portions 63), at least at a time at which the upper case 14 is inverted such that the inner face of the ceiling plate 14A faces downward and the upper case 14 is caused to cover the lower case 16 (i.e., when the case 12 is being assembled).

Specifically, these undercut portions 70A stick out to the inner sides to extents such that drawing from a die thereof at a time of molding with the die is possible (around 0.1 to 0.5 mm, preferably around 0.3 mm). Moreover, the undercut portions 70A are formed in substantially circular arc forms in side sectional view, such that this drawing can be performed with ease. Here, the retaining portions 70 are formed with heights of around 4 mm and plate thicknesses of around 0.35 to 1.2 mm, preferably around 0.5 to 0.8 mm.

These retaining portions 70 may be molded integrally with the upper case 14, or may be molded as separate bodies and affixed to the upper case 14. If the retaining portions 70 are structured by being molded separately and affixed to the upper case 14, it is possible to assemble the retaining portions 70 after the locking members 90 have been disposed at the upper case 14. Hence, it is possible to mold the undercut portions 70A with forms that stick out further, gate forms ('U' shapes) or the like, and there is a benefit in that a later-described stopper 76 can be rendered unnecessary.

A calking pin 72 is provided protruding substantially from the middle of the inner face of the ceiling plate 14A (centrally to the mounting portion 60, on an axial center line of the reel hub 42). The calking pin 72 is for mounting a plate spring 56, which serves as an urging member. The plate spring 56 is formed so as to divide into three branches (three vanes) from a middle thereof, such that the plate spring 56 abuts against respective radial direction inner side faces of the cam portions 94 at the locking members 90. A calking hole 56A is formed through a central portion of the plate spring 56.

Hence, the plate spring 56 is attached to the upper case 14 by the calking pin 72 passing through this calking hole 56A and being calked (squeezed). With such a structure for disposing the plate spring 56 at a substantially central portion of the inner face of the upper case 14 (at the middle of the mounting portion 60) to serve as the urging member, it is possible to design for effective utilization of dead space inside the case 12 and the urging member can be compactly structured, which are preferable. The locking members 90 are constantly urged to the outer side in radial directions from the center of the mounting portion 60 (the center of the reel 40) by the plate spring 56.

Further, at predetermined positions (positions at which a certain level of tension applies, as described later) on lines extending from the accommodation portions 63, at the outer side relative to the tubular wall 62, stopper ribs 74 are provided protruding from the ceiling plate 14A. The stopper ribs 74 serve as position-restricting members for temporarily (until the upper case 14 covers over the lower case 16) provisionally stopping the locking members 90 that are being urged by the plate spring 56 while the plate spring 56 is being installed between the locking members 90. As a result, the locking members 90 are held by the plate spring 56 and the stopper ribs 74 in a state in which the certain level of tension is applied thereto. Thus, the locking members 90 are more assuredly prevented from falling out. Here, because it is possible for the plate spring 56 to be installed after the later-described stopper 76 has been welded onto the support ribs 66, installation of the plate spring 56 can be performed excellently and with ease.

Figure 8:
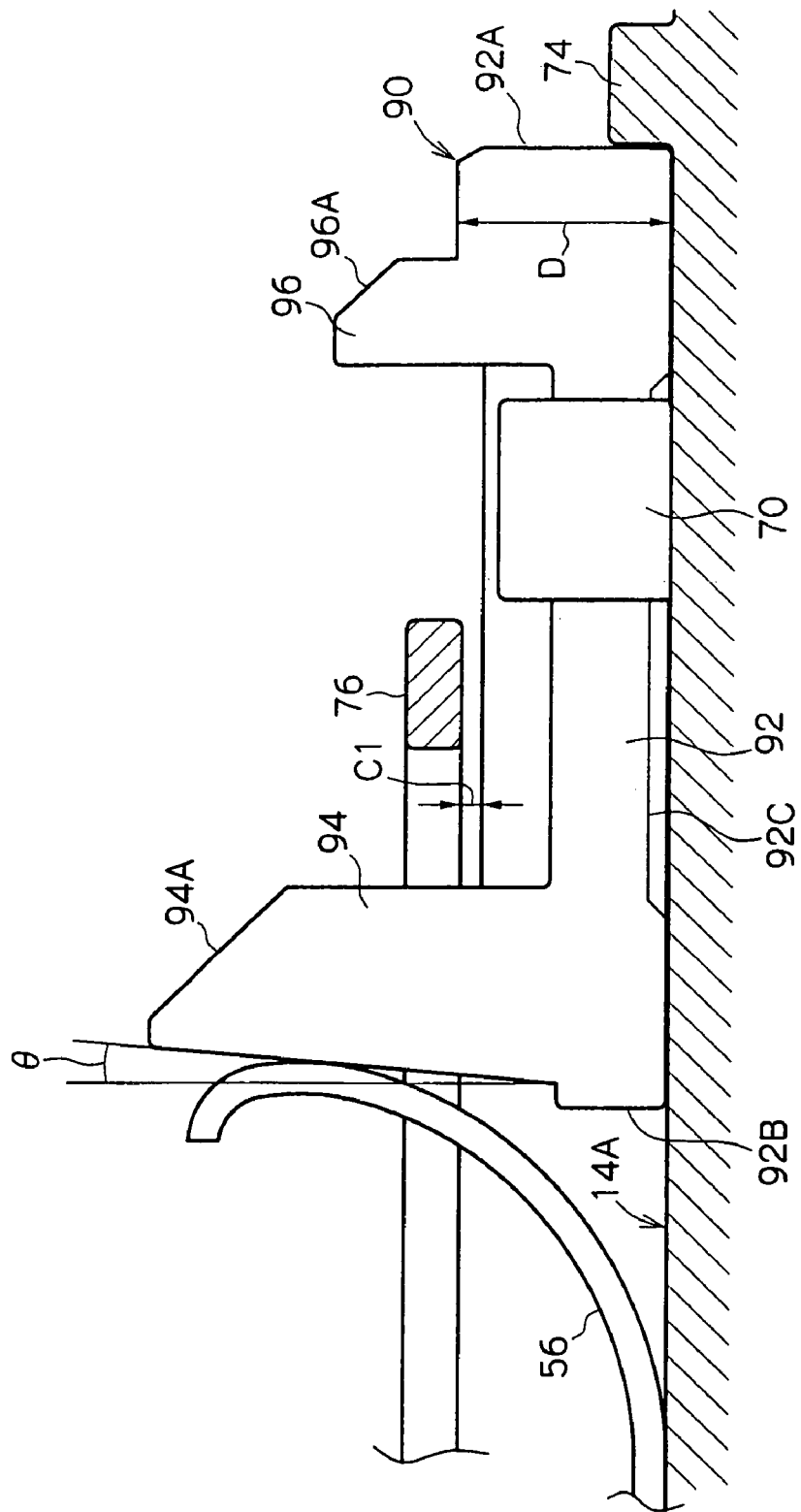
FIG. 8 is a schematic side view of the locking member being retained at the retaining portions.

After the locking members 90 have been provisionally restrained and retained at the retaining portions 70, the ring-form stopper 76, which is made of resin, is welded to the support ribs 66 by ultrasonic waves or the like. The stopper 76 serves as a disengagement prevention member, which permanently restrains and retains the locking members 90 such that the locking members 90 will not disengage even when sliding. As shown in FIG. 8, a predetermined clearance C1 (C1=around 0.05 to 0.4 mm) between the locking members 90 and the stopper 76 is assured such that the stopper 76 will not become an obstruction when the locking members 90 are sliding. Heights of the support ribs 66 are regulated such that this clearance C1 is assured.

When the recording tape cartridge 10 has been assembled (when the lower case 16 has been covered over the upper case 14), an upper end of the compression coil spring 78 abuts onto the stopper 76. Thus, the compression coil spring 78 is retained between the stopper 76 (the upper case 14) and the flat surface 80A (the brake member 80). Note that the upper end of the compression coil spring 78 need not abut against the stopper 76, and could abut against the support ribs 66.

In a case in which the upper end of the compression coil spring 78 is caused to abut against the stopper 76, there is a benefit in that the stopper 76 need not be welded onto the support ribs 66. Moreover, the stopper 76 is not limited to the ring form in the drawings, as long as the stopper 76 at least bridges between the support ribs 66 at respective sides of the locking members 90, such that the locking members 90 are constantly prevented from dropping out. Furthermore, a structure in which only this stopper 76 is provided and the retaining portions 70 are omitted is possible, and a structure in which the stopper 76 is omitted and only the retaining portions 70 are provided is also possible.

The locking members 90 are held in the state in which dropping out is prevented by the retaining portions 70 and the stopper 76 so as to be slideable in the radial directions in the accommodation portions 63. Each locking member 90 includes a substantially square column-form main body portion 92, which slides against the inner face of the ceiling plate 14A of the upper case 14. The cam portion 94 is integrally provided protruding substantially in the axial direction of the reel 40 at a radial direction inner side end portion 92B of the main body portion 92. The cam portion 94 has a substantially square column form with a width the same as that of the main body portion 92.

As shown in FIG. 8, this cam portion 94 is provided protruding to a predetermined height so as to be inclined at a predetermined angle θ toward the outer side relative to the main body portion 92. In the state in which a radial direction outer side end portion 92A of the locking member 90 (i.e. of the main body portion 92) is anchored by the stopper rib 74, the cam portion 94 converts urging force from the plate spring 56 to a force component toward the upper case 14. As a result, this structure more assuredly prevents dropping out of the locking member 90 from the accommodation portion 63 during this installation, and further improves installation characteristics.

A lower end face outward side of the cam portion 94 is formed with the taper surface (cam surface) 94A, which is angled at 30° to 60°, preferably at 45°. The taper surface 94A engages with the taper surface 86A of the engaging protrusion 86 of the brake member 80. Because the engaging protrusion 86 and the cam portion 94 are both formed in substantially square column forms, stiffnesses thereof are high, and excellent engagement thereof is possible. Further, a thickness D (see FIG. 8) of the locking member 90 (the main body portion 92) at the radial direction outer side end portion 92A is formed to be substantially equal to a separation W (see FIG. 2) between an upper face of the upper flange 44 and the inner face of the ceiling plate 14A when the reel 40 is disposed at a lowermost position thereof in the case 12.

An engagement portion 96 is integrally provided at a vicinity of the radial direction outer side end portion 92A. The engagement portion 96 protrudes in the axial direction of the reel 40 (vertically) to a predetermined height for engaging with an upper edge portion of the reel hub 42. This engagement portion 96 protrudes with a width the same as that of the main body portion 92 and is shorter than the cam portion 94. A lower end face outward side of the engagement portion 96 is formed with a taper surface 96A, which is inclined at a predetermined angle. The shape in plan view of an outer side face, including this taper surface 96A, is formed to a circular arc shape to match the inner peripheral face of the reel hub 42.

Consequently, with this structure, when the recording tape cartridge 10 is assembled (i.e., when the upper case 14 is caused to cover the lower case 16), it is easy for the engagement portions 96 to engage with the upper edge portion of the reel hub 42 in accordance with movement of the locking members 90 that had been temporarily stopped by the stopper ribs 74. After this engagement, the radial direction outer side end portions 92A of the main body portions 92 move away from the stopper ribs 74, as shown in FIG. 2.

At this time, outer side faces of the engagement portions 96, excluding the taper surfaces 96A, abut against the inner peripheral face of the reel hub 42 (and push the inner peripheral face). Therefore, it is preferable if a draft angle at the inner peripheral face of the reel hub 42, for drawing from a die thereof, is 0°. If this draft angle is greater than 0°, the upper edge portion of the reel hub 42 will broaden toward the outer side (the diameter of the upper edge portion will be larger). Thus, force of pressing by the engagement portions 96 may be reduced and the locking members 90 may not function excellently.

Figure 9:
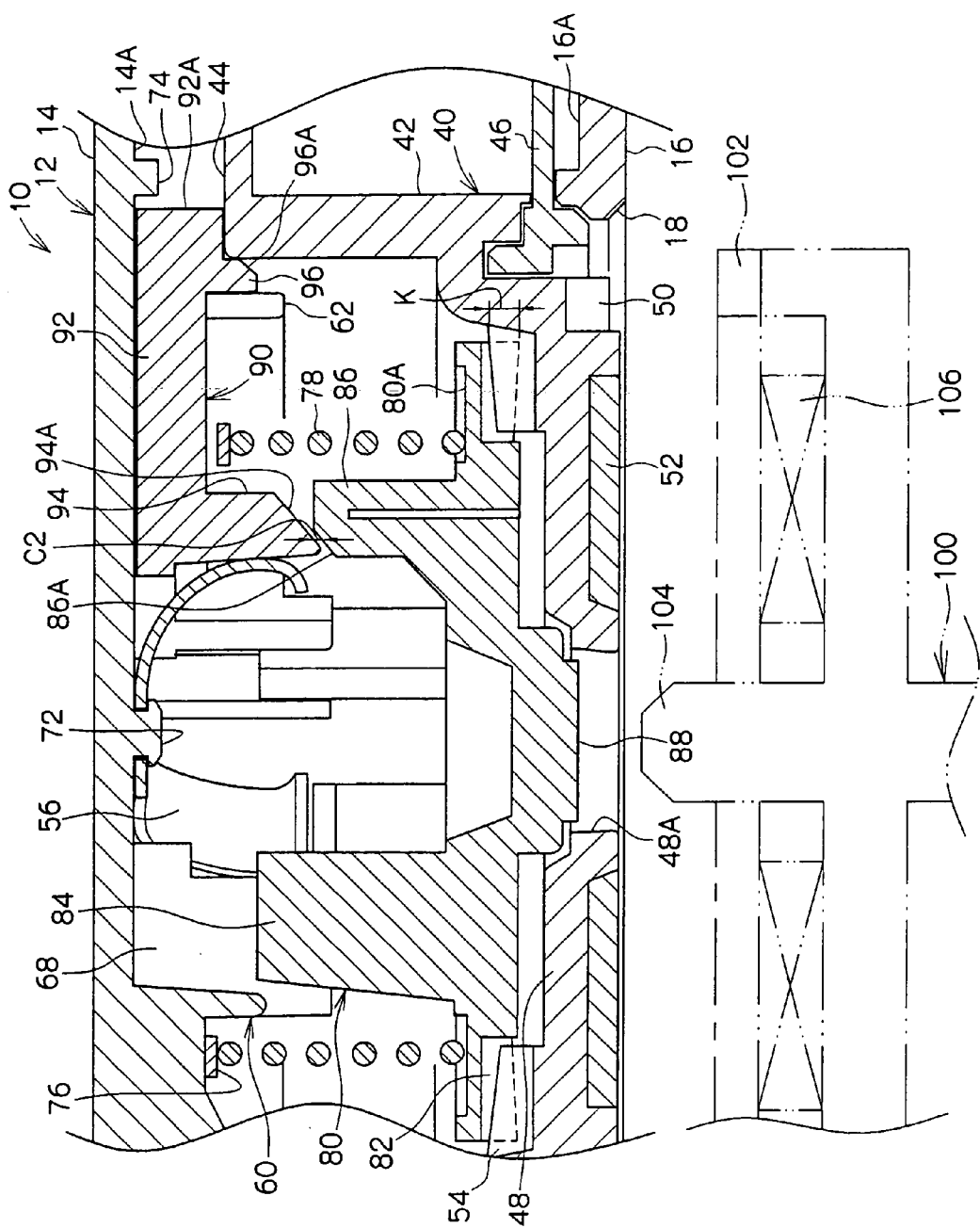
FIG. 9 is a partial enlarged schematic side sectional view of the recording tape cartridge prior to the raising of the rotation shaft.

With the structure described above, at times of non-use of the recording tape cartridge 10, as shown in FIG. 9, the brake member 80 is urged downward by the urging force of the compression coil spring 78 and the locking members 90 are urged to the radial direction outer side by the urging force of the plate spring 56. At such times, rotation of the brake member 80 with respect to the case 12 is blocked by the guide portions 84 inserted at the guide wall portions 68, and inadvertent rotation of the reel 40 is blocked by the engaging gear 54 in the reel hub 42 securely meshing with the braking gear 82 of the brake member 80.

Further, at times of non-use of the recording tape cartridge 10, raising of the reel 40 is blocked by the engagement portions 96 of the locking members 90 engaging with the upper edge portion of the reel hub 42. That is, raising of the reel 40 is blocked by the outer side faces of the engagement portions 96, excluding the taper surfaces 96A, pushing against the inner peripheral face of the reel hub 42 and the end portions 92A of the main body portions 92, which are at radial direction outer sides relative to the engagement portions 96, being interposed between the upper face of the upper flange 44 and the inner face of the ceiling plate 14A (raising of the reel 40 is blocked by lower faces of the end portions 92A surface-contacting the upper face of the upper flange 44 or opposing the same with a very small separation therebetween).

Here, at times at which the recording tape cartridge 10 is not being used, the engaging protrusions 86 and the cam portions 94 are in a state of not abutting against one another, so that a component of force from the plate spring 56 does not act on the brake member 80. Further, a clearance C2 in the axial direction of the reel 40 (the direction of movement of the brake member 80) between the mutually opposed taper surfaces 86A and 94A is necessarily smaller than a meshing amount K between the braking gear 82 and the engaging gear 54 (in other words, smaller than a raising stroke of the brake member 80 until the meshing of the braking gear 82 with the engaging gear 54 is released).

This is so because, if the clearance C2 were larger than the meshing amount K, the brake member 80 could easily be raised by an amount corresponding to the clearance C2, due to impact caused by falling or the like, and the reel 40 would be inadvertently rendered rotatable. Therefore, the clearance C2 between the engaging protrusions 86 and the cam portions 94 is very small, and gaps between the lower faces of the outer side end portions 92A of the main body portions 92 and the upper face of the upper flange 44 are substantially the same as the clearance C2 or even smaller (substantially in surface-contact). Consequently, at times of non-use of the recording tape cartridge 10, the reel 40 and the brake member 80 are practically unliftable (movement thereof in the axial direction of the reel 40 is not possible).

Figure 10:
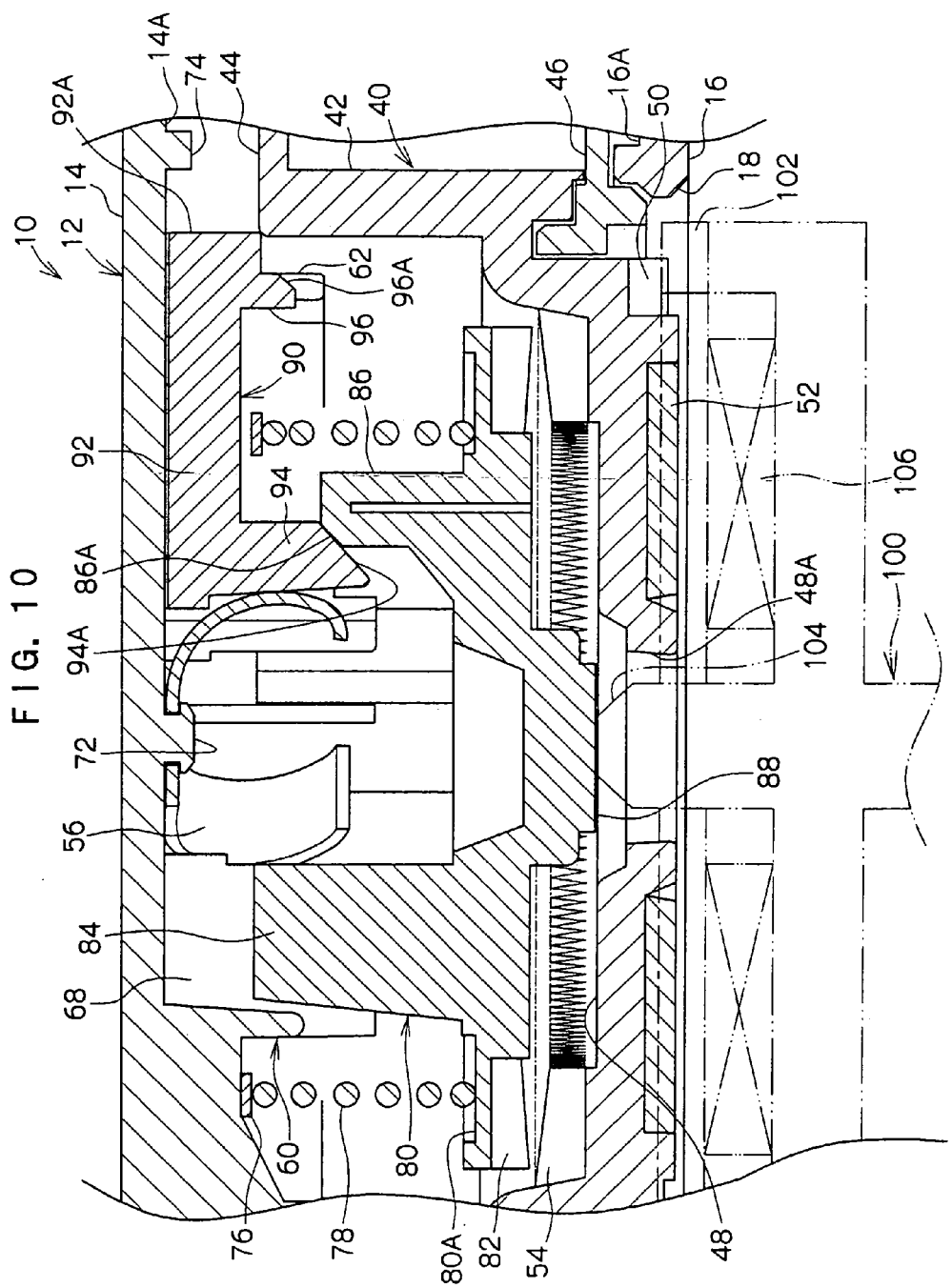
FIG. 10 is a partial enlarged schematic side sectional view of the recording tape cartridge during the raising of the rotation shaft.

On the other hand, at times of use of the recording tape cartridge 10, as shown in FIG. 10, the release protrusion 104 abuts against the operation protrusion 88, and the brake member 80 is lifted by a predetermined height, against the urging force of the compression coil spring 78. As a result, the taper surfaces 86A of the engaging protrusions 86 and the taper surfaces 94A of the cam portions 94 abut against one another. Further, the taper surfaces 94A slide on the taper surfaces 86A and, as shown in FIG. 1, the cam portions 94 pass in to the inner side of the engaging protrusions 86.

That is, the meshing of the braking gear 82 with the engaging gear 54 is released and, concurrently therewith, the locking members 90 slide to the radial direction inner side against the urging forces of the plate spring 56 and the outer side faces of the engagement portions 96 move away from the inner peripheral face of the reel hub 42. At the same time, the outer side end portions 92A of the main body portions 92 are withdrawn from between the upper face of the upper flange 44 and the inner face of the ceiling plate 14A (the lower faces of the end portions 92A move away from the upper face of the upper flange 44). As a result, the reel 40 becomes rotatable inside the case 12 and is liftable to the predetermined height.

Here, when the brake member 80 is raised, the cam portions 94 pass in to the inner side of the engaging protrusions 86. At this time, only the outer side faces of the cam portions 94 abut against (make contact with) the inner side faces of the engaging protrusions 86. Thus, upper end faces of the engaging protrusions 86, including the taper surfaces 86A, do not abut against (contact) the locking members 90, and lower end faces of the cam portions 94, including the taper surfaces 94A, do not abut against (contact) the brake member 80.

Further, at this time, the clearance between the outside surface of the guide portion 84 and the inside surface of the guide wall portion 68 is set such that the clearance between the outside surface of the guide portion 84 at the tip end side thereof and the inside surface of the guide wall portion 68 is the same as the clearance between the inside surface of the guide wall portion 68 at the tip end side thereof and the outside surface of the guide portion 84, or the clearance at the outside surface of the guide portion 84 at the tip end side thereof is larger than the clearance at the inside surface of the guide wall portion 68 at the tip end side thereof, and the maximum clearance is set between 0.05 mm and 0.3 mm. Further, draft angles for drawing from dies of inside surface of the engaging protrusion 86 and of the outside surface of the cam portion 94 are set 0°, respectively, and the draft angles for drawing from dies of outside surface of the guide portion 84 and inside surface of the guide wall portion 68, which face each other, are greater than or equal to 0.5°, respectively.

Therefore, pressing forces (the urging forces) with which the locking members 90 are pushed by the plate spring 56 are taken up by the inner side faces of the engaging protrusions 86, it does not occur that the brake member 80 (the engaging protrusion 86) is tilted obliquely. Therefore, no force component is generated that would push the brake member 80 downward.

Thus, at times of rotation of the reel 40, the pressing forces (urging forces) from the plate spring 56 act only in the radial direction of the reel 40, and do not act (i.e., is not transmitted) in the axial direction of the reel 40 (the vertical direction). Accordingly, the locking members 90 are stably retained in an unlocked state.

Thus, even though the structure in which the plate spring 56 is provided, because a pressing force (urging force) in the axial direction of the reel 40 (the vertical direction) is, similarly to the prior art, simply the urging force of the compression coil spring 78, it is possible for no excess load to be applied in the axial direction of the rotation shaft 100 (i.e., downward). Herein, it is preferable if the inner side faces of the engaging protrusions 86 and the outer side faces of the cam portions 94 both have draft angles of 0°. If provision of a draft angle is required, it is desirable that the draft angle is set at no more than 3°, so that a force component which pushes downward against the brake member 80 will not be strongly generated.

As shown in FIGS. 7 and 8, it is preferable if suitable recess portions 92C (or possibly protrusion portions) are formed at the main body portion 92 of each locking member 90, at the upper face thereof which contacts the inner face of the ceiling plate 14A of the upper case 14 and at the lower face which contacts the stopper 76. When such recess portions 92C (or protrusion portions) are formed, areas of contact with the inner face of the ceiling plate 14A of the upper case 14 and with the stopper 76 can be reduced. Hence, it is possible to slide the locking members 90 with less resistance.

Next, operation of the recording tape cartridge 10 with the structure described above will be described. At times of non-use (when not loaded at a drive device), the door 30 of the recording tape cartridge 10 closes off the opening 20, due to the urging force of the torsion spring 28. Further, the leader tape 22 is disposed along the left side wall 12B due to the projecting portions 22B thereof being accommodated (inserted) and retained in the accommodating recess portions 24.

Further, as shown in FIGS. 2 and 9, the reel 40 is urged downward by the compression coil spring 78, via the brake member 80. Thus, the braking gear 82 of the brake member 80 is firmly meshed with the engaging gear 54 inside the reel hub 42 by the urging force of the compression coil spring 78, and unintended rotation of the reel 40 is blocked.

The locking members 90 are urged toward the radial direction outer side from the center of the mounting portion 60 (the center of the reel 40) by the urging forces of the plate spring 56, and the engagement portions 96 of the locking members 90 engage with the upper edge portion of the reel hub 42. That is, the outer side faces of the engagement portions 96, excluding the taper surfaces 96A, press against the inner peripheral face of the reel hub 42, and the end portions 92A of the main body portions 92, at the radial direction outer side relative to the engagement portions 96, are interposed between the upper face of the upper flange 44 and the inner face of the ceiling plate 14A (i.e., the lower faces of the end portions 92A face the upper face of the upper flange 44 with surface contact or very small separations).

Here, the thickness D of the outer side end portions 92A of the locking members 90 (the main body portions 92) is formed to be substantially equal to the separation W between the inner face of the ceiling plate 14A and the upper face of the upper flange 44 when the reel 40 is disposed at the lowermost position thereof in the case 12. Thus, lifting of the reel 40 is blocked by the locking members 90. That is, even if impact due to falling or the like is applied to the recording tape cartridge 10, the reel 40 will not be lifted.

Further, the clearance C2 between the cam portions 94 of the locking members 90 and the engaging protrusions 86 of the brake member 80 is smaller than the meshing amount K of the braking gear 82 with the engaging gear 54, and is extremely narrow. Thus, even if impact due to falling or the like is applied to the recording tape cartridge 10, the brake member 80 will not be substantially lifted. Therefore, the braking gear 82 does not disengage from the engaging gear 54, problems in which the brake member 80 is inclined and caught up (tipped up) will not occur. Accordingly, the recording tape T will not suffer from adverse effects thereof.

Anyway, when data is to be recorded at the recording tape T of the recording tape cartridge 10, or data that has been recorded at the recording tape T of the recording tape cartridge 10 is to be replayed, the recording tape cartridge 10 is loaded into a drive device (not shown). That is, the recording tape cartridge 10 is inserted, from the front wall 12A side thereof, at a loading aperture (not shown) of the drive device.

Hence, in accordance with this loading, an opening/closing member (not shown) of the drive device moves relatively toward a right end portion of the door 30 (the right side further than the support shaft 26), and abuts and pushes against this right end portion. Correspondingly, the door 30 rotates about the support shaft 26, against the urging force of the torsion spring 28, and opens up the opening 20.

Here, gaps of around 0.3 to 0.5 mm are formed by the respective annular protrusion portions 34 between the upper end face 30A of the door 30 and the upper case 14 and between the lower end face 30B of the door 30 and the lower case 16. Thus, of the door 30, only the annular protrusion portions 34 are in contact with the upper case 14 and the lower case 16. Therefore, the door 30 can rotate with little sliding resistance.

At this door 30, it is desirable if at least the rotation and sliding portions 32 and the annular protrusion portions 34 are formed of an olefin-type resin such as POM or the like. In accordance therewith, sliding resistances against the upper case 14 and the lower case 16 that are formed of a resin such as PC or the like can be further reduced, and sliding resistance against the support shaft 26 can be reduced.

Further, the coil portion 28A of the torsion spring 28 is disposed between the rotation and sliding portions 32 and, if the rotation and sliding portions 32 are formed of an olefin-type resin such as POM or the like, the rotation and sliding portions 32 have little susceptibility to abrasion than the case 12 that is formed of a resin such as PC or the like. Thus, even though the coil portion 28A of the torsion spring 28 is moved slidingly by the rotation of the door 30, abrasion dust or the like is unlikely to be generated, and the recording tape T will not be subjected to adverse effects.

Anyway, when this door 30 rotates and the opening 20 opens up, a drawing-out member (not shown) of the drive device approaches the opening 20 from the left side wall 12B side thereof, and engages with the hole portion 22A of the leader tape 22. At this time, because the leader tape 22 is prepared in a state of close contact with the left side wall 12B, this drawing-out member can reliably engage with the hole portion 22A.

When the drawing-out member has engaged with the hole portion 22A thus, the drawing-out member moves away from the opening 20, and the leader tape 22 is accordingly drawn out from inside the case 12. Hence, the leader tape 22 that has been drawn out from inside the case 12 is wound round at a winding reel (not shown) of the drive device.

Meanwhile, as shown in FIG. 10, the rotation shaft 100 of the drive device advances in through the gear aperture 18 and moves closer to the base wall 48 of the reel 40. Thus, the release protrusion 104 pushes the operation protrusion 88 and lifts up the brake member 80. Correspondingly, the meshing of the engaging gear 54 with the braking gear 82 is released. However, before that, the engaging protrusions 86 abut against the cam portions 94 of the locking members 90, and push the cam portions 94 further upward.

Correspondingly, the taper surfaces 94A of the cam portions 94 slide on the taper surfaces 86A of the engaging protrusions 86, and the locking members 90 slide to the radial direction inner side on the inner face of the ceiling plate 14A (in the accommodation portions 63), against the urging forces of the plate spring 56. At this time, because the recess portions 92C are formed at the main body portions 92, the locking members 90 can slide with little resistance. Further, because of the stopper 76, the locking members 90 can slide in a stable state without disengaging from the accommodation portions 63 (the mounting portion 60).

When the locking members 90 slide to the radial direction inner side in the accommodation portions 63 in this manner, the outer side faces of the engagement portions 96 of the locking members 90 move away from the inner peripheral face of the reel hub 42, and the outer side end portions 92A of the main body portions 92 are withdrawn from between the upper face of the upper flange 44 and the inner face of the ceiling plate 14A (the lower faces of the end portions 92A move away from the upper face of the upper flange 44).

Figure 11:
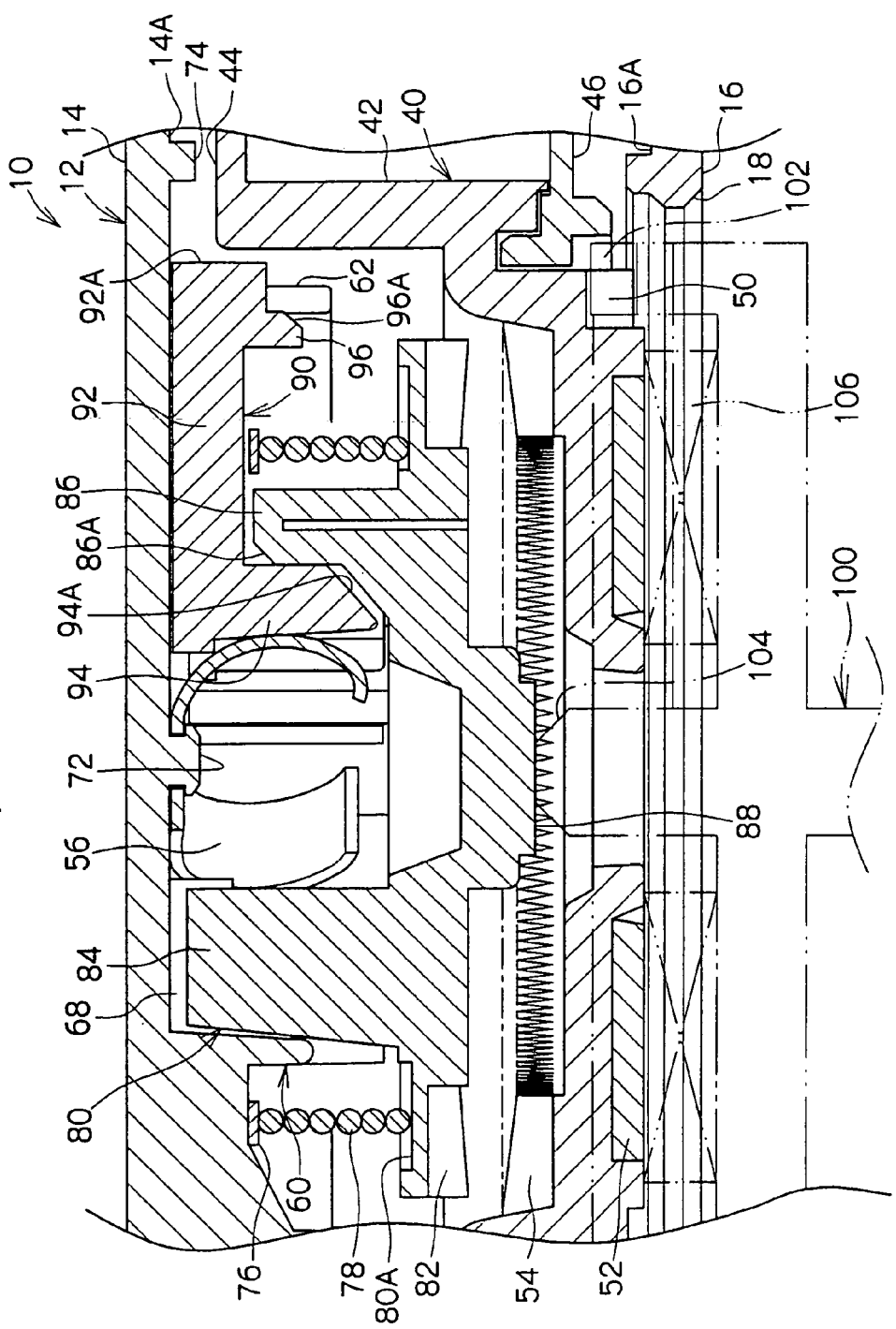
FIG. 11 is a partial enlarged schematic side sectional view of the recording tape cartridge subsequent to the raising of the rotation shaft.

Then, as shown in FIGS. 3 and 11, when the cam portions 94 pass in (drop in) at the inner sides of the engaging protrusions 86, the outer side end portions 92A of the main body portions 92 are disposed at the inner side of the reel hub 42 and the outer side faces of the cam portions 94 abut against the inner side faces of the engaging protrusions 86. In consequence, the engagement of the engagement portions 96 with the upper edge portion of the reel hub 42 is released, and the locking members 90 are maintained in the unlocked state.

Then, when the rotation shaft 100 rises further, the drive gear 102 meshes with the reel gear 50 and the reel plate 52 is attracted by the annular magnet 106. When the drive gear 102 has meshed with the reel gear 50, the reel 40 can be raised to the predetermined height in the case 12 and rotation is possible. When the drive gear 102, and thus the reel 40, is driven to rotate synchronously with the winding reel, the recording tape T is sequentially drawn out to the drive device side, and recording of data to the recording tape T and replaying of data recorded at the recording tape T is implemented by a recording/replaying head (not shown) of the drive device.

Here, the locking members 90 and the brake member 80 abut (contact) only at the outer side faces of the cam portions 94 and the inner side faces of the engaging protrusions 86. Thus, the upper end faces of the engaging protrusions 86, including the taper surfaces 86A, do not abut against (contact) the locking members 90, and the lower end faces of the cam portions 94, including the taper surfaces 94A, do not abut against (contact) the brake member 80. Further, the inner side faces of the engaging protrusions 86 and the outer side faces of the cam portions 94 both have draft angles of 0°.

Further, the draft angles for drawing from dies of outside surfaces of the guide portions 84 and inside surfaces of the guide wall portions 68, which face each other, are greater than or equal to 0.5°, respectively. Further, the clearance between the outside surface of the guide portion 84 at the tip end side thereof and the inside surface of the guide wall portion 68 is larger than or equal to the clearance between the inside surface of the guide wall portion 68 at the tip end side thereof and the outside surface of the guide portion 84, and the maximum clearance is set between 0.05 mm and 0.3 mm.

Therefore, the pushing forces (urging forces) with which the locking members 90 are pushed by the plate spring 56 are received (absorbed) by the inner periphery faces of the engaging protrusions 86 (i.e., act only in the radial direction of the reel 40), further, it does not occur that the brake member 80 (the engaging protrusion 86) is tilted obliquely. Therefore, there is no force that pushes downward against the brake member 80 (i.e., there is no force being transmitted in the axial direction of the reel 40).

Thus, at times of use of the recording tape cartridge 10 (times of rotation of the reel 40), pressing force (urging force) on the brake member 80 is just the urging force of the compression coil spring 78, similarly to the prior art. Therefore, with the structure in which a locking mechanism, meaning the plate spring 56, is provided, there is no problem such that an excess load downward in the axial direction is applied to the rotation shaft 100, and the reel 40 can be stably rotated by the rotation shaft 100.

Subsequently, when the recording tape cartridge 10 is to be taken out from the drive device, first, the drive gear 102 is reverse-rotated and the recording tape T is wound back to the reel 40. Then the leader tape 22 is removed from the winding reel and is returned through the opening 20 into the case 12. That is, the projecting portions 22B of the leader tape 22 are accommodated (inserted) in the accommodating recess portions 24, and are retained at predetermined positions in the case 12.

Next, the rotation shaft 100 descends, the meshing of the drive gear 102 with the reel gear 50 is released, and the annular magnet 106 is moved away from the reel plate 52. Then the reel 40 is lowered by the urging force of the compression coil spring 78, via the brake member 80. Correspondingly, the locking members 90 are slid to the radial direction outer side in the accommodation portions 63 by the urging forces of the plate spring 56, and the taper surfaces 94A of the cam portions 94 slide on the taper surfaces 86A of the engaging protrusions 86. At this time, because of the stopper 76, the locking members 90 can slide in a stable state without disengaging from the accommodation portions 63 (the mounting portion 60).

Then, when the engaging protrusions 86 move away from the cam portions 94, the engagement portions 96 engage with the upper edge portion of the reel hub 42. That is, the outer side faces of the engagement portions 96, excluding the taper surfaces 96A, are pushed against the inner peripheral face of the reel hub 42 by the urging forces of the plate spring 56, and the outer side end portions 92A of the main body portions 92 are interposed between the upper face of the upper flange 44 and the inner face of the ceiling plate 14A (the lower faces of the end portions 92A oppose the upper face of the upper flange 44 with surface contact or very small separations). Thus, the reel 40 is returned to the state in which lifting thereof is blocked.

Further, at this time, the braking gear 82 is securely meshed with the engaging gear 54 by the urging force of the compression coil spring 78, and inadvertent rotation of the reel 40 is blocked. Then, after the rotation shaft 100 has been taken out through the gear aperture 18, the recording tape cartridge 10 is ejected from the loading aperture. In accordance with this ejection operation, the opening/closing member moves away from the right end portion. Correspondingly, the door 30 is rotated about the support shaft 26 by the urging force of the torsion spring 28, in the opposite direction to the rotation mentioned above, and closes off the opening 20. Thus, the recording tape cartridge 10 whose opening 20 has been closed off is ejected from the drive device.

Now, a variant example, which is a case in which coil springs 58 are employed instead of the plate spring 56 as urging members for urging the locking members, will be described. Note that components that are the same as in the descriptions above are assigned the same reference numerals in the drawings, and descriptions thereof are omitted. In addition, the coil springs 58 are provided in correspondence with respective locking members 91. Accordingly, three of the coil springs 58 are provided in this case. The coil springs 58 have the advantage of being available at lower cost than the plate spring 56.

Figure 12:
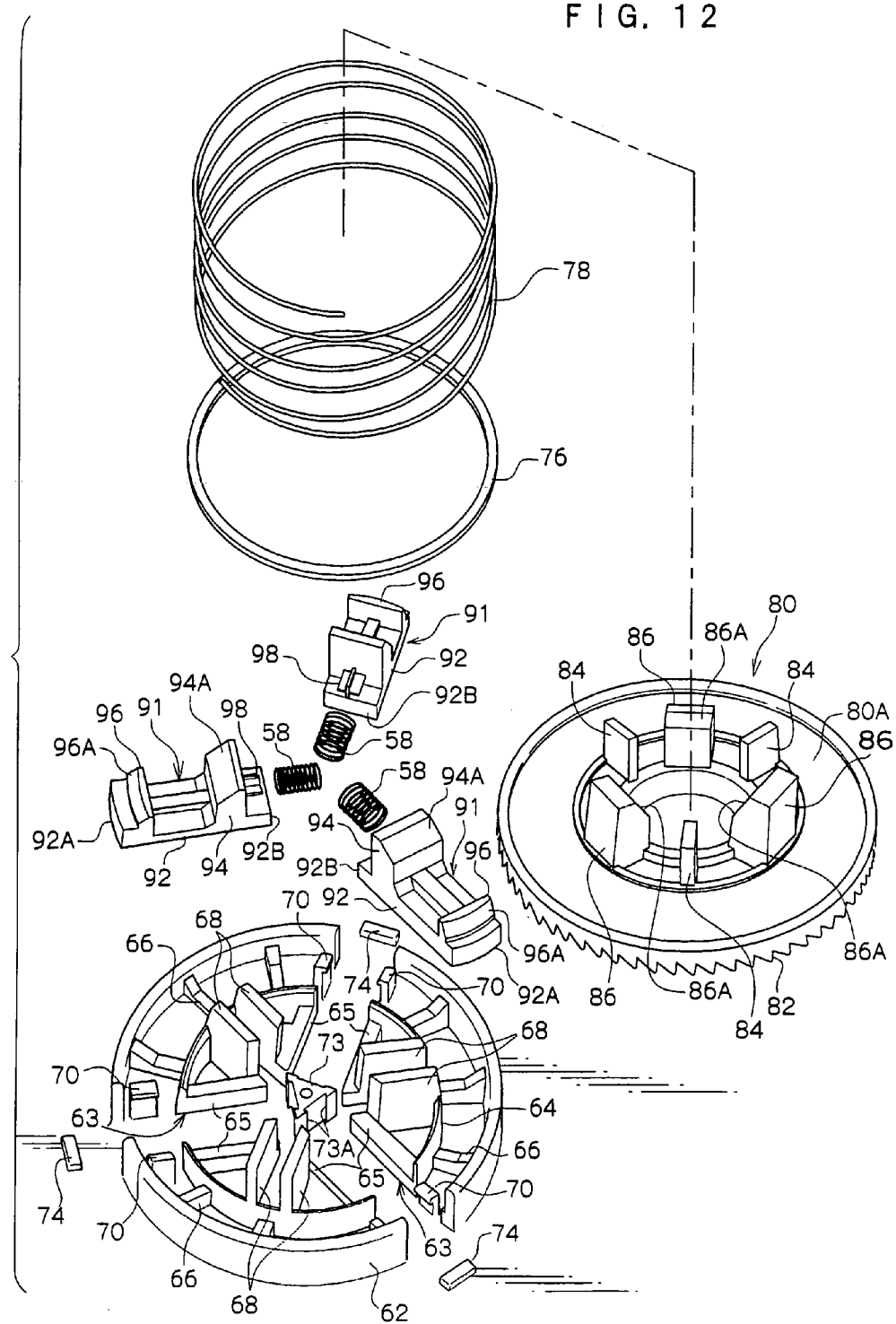
FIG. 12 is a schematic exploded perspective view showing structure of another mounting portion formed at the upper case.
Figure 13:
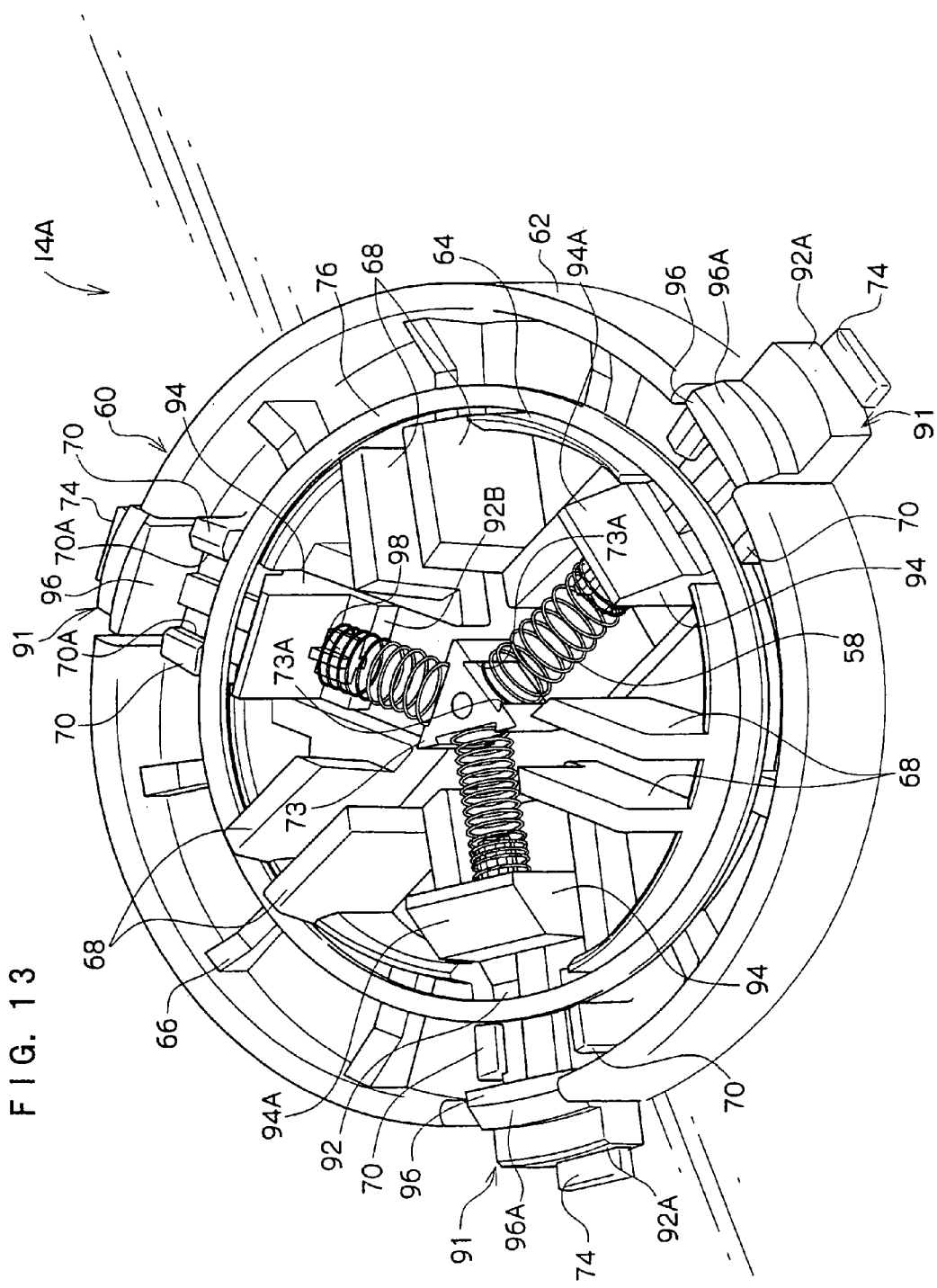
FIG. 13 is a schematic perspective view showing the other mounting portion formed at the upper case.
Figure 14:
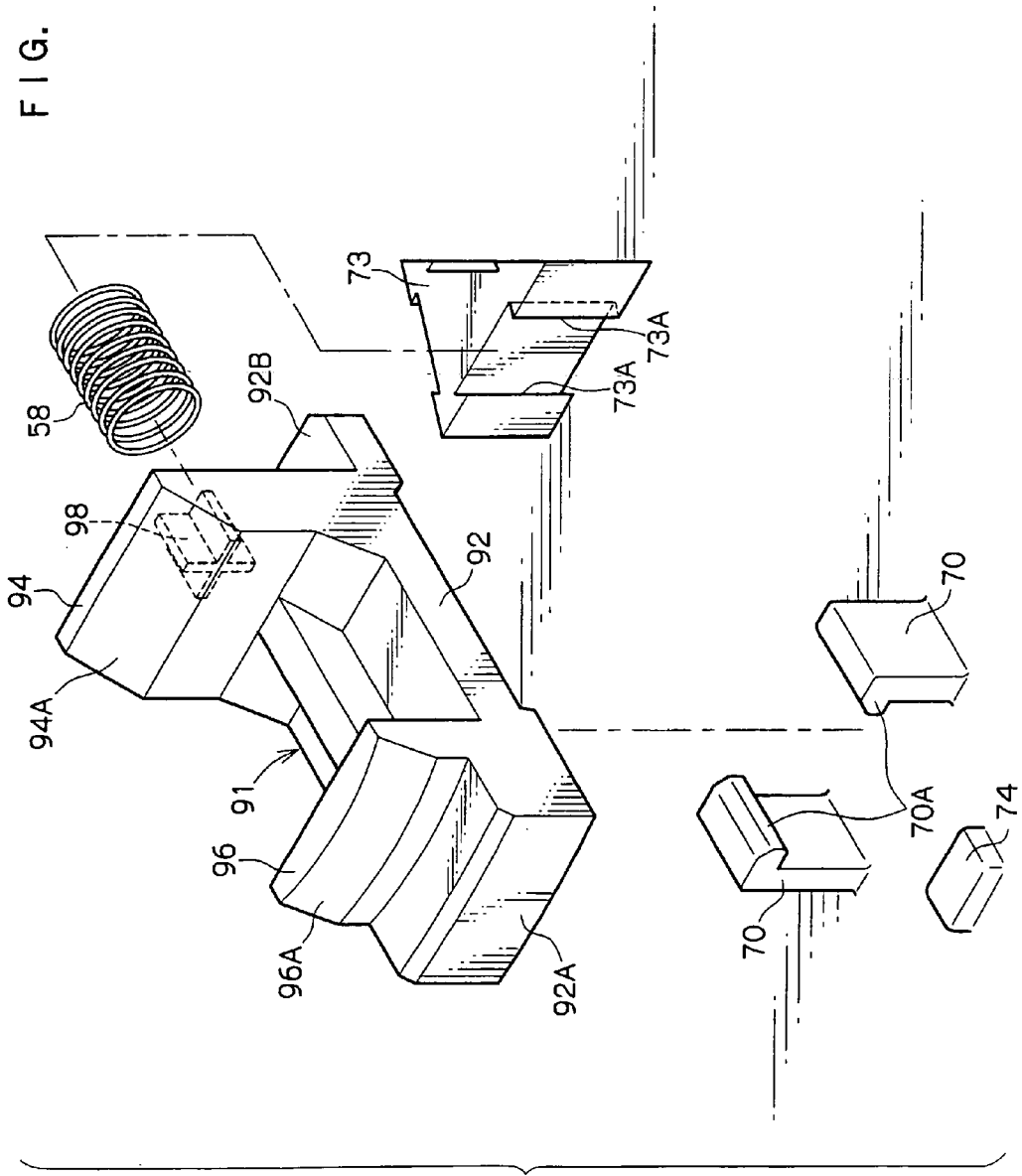
FIG. 14 is a schematic perspective view showing how a locking member and a coil spring are installed.

As shown in FIGS. 12 to 14, when the coil springs 58 are employed, the locking members 91, which differ from the locking members 90 in the following respects, are employed. Specifically, at each locking member 91, the cam portion 94 is provided protruding perpendicularly with respect to the main body portion 92 (i.e., in the axial direction of the reel 40). Further, the radial direction inner side end portion 92B is extended toward the radial direction inner side by a predetermined length beyond the cam portion 94 of the main body portion 92.

Further still, at the radial direction inner side face of the cam portion 94, a fitting portion 98 is provided protruding toward the radial direction inner side by a predetermined length. The fitting portion 98 has a 'cross' form in cross-section, which the coil spring 58 fits round. An outer diameter of this fitting portion 98 is formed to be slightly larger than an inner diameter of the coil spring 58, so that the coil spring 58 will not disengage from the fitting portion 98.

Meanwhile, at the mounting portion 60, an engaging protrusion 73 for retaining the coil springs 58 is protrudingly provided at the middle of the mounting portion 60 instead of the calking pin 72. This engaging protrusion 73 is formed in a substantially triangular column form so as to be capable of retaining the three coil springs 58 at the same time. At two end portions of each side face of the engaging protrusion 73, a pair of engaging pawls 73A is provided extending the whole height of the side face. These engaging pawls 73A are formed so as to protrude to inward sides thereof (toward one another), and are capable of anchoring and retaining one end (one coil) of each coil spring 58 from both sides thereof.

Here, it will be preferable if the fitting portions 98 are also formed at the engaging protrusion 73. However, in such a case, because there will be undercuts, molding will be difficult. Therefore, the engaging protrusion 73 is formed with the pairs of engaging pawls 73A spanning the whole height of the engaging protrusion 73, and when the coil springs 58 and locking members 91 are assembled, assembly characteristics thereof are favorable and, moreover, the coil springs 58 and locking members 91 can be reliably retained between the engaging protrusion 73 and the stopper ribs 74.

Further, in the case of the plate spring 56, it is possible to easily assemble the plate spring 56 even after the stopper 76 has been welded onto the support ribs 66. However, in the case of the coil springs 58, it is difficult to assemble the coil springs 58 after the stopper 76 has been welded onto the support ribs 66. Therefore, it is more necessary to retain the locking members 91 to prevent the locking members 91 from flying out.

Therefore, rather than just forming the engaging pawls 73A at the engaging protrusion 73, the radial direction inner side end portions 92B of the main body portions 92 are extended to a predetermined length (so as to be slightly longer than the fitting portion 98). With this kind of structure, centers of gravity of the locking members 91 can be lowered. Thus, when the locking members 91 and the coil springs 58 are put into the mounting portion 60 (the accommodation portions 63) and retained between the engaging protrusion 73 and the stopper ribs 74, the locking members 91 can be prevented from being flown out from the mounting portion 60 (the accommodation portions 63) by tension of the coil springs 58.

Next, operation of the recording tape cartridge 10 which employs the coil springs 58 as described above will be described. Note that components other than components relating to the coil springs 58 are the same as described earlier, and descriptions thereof are omitted.

Figure 15:
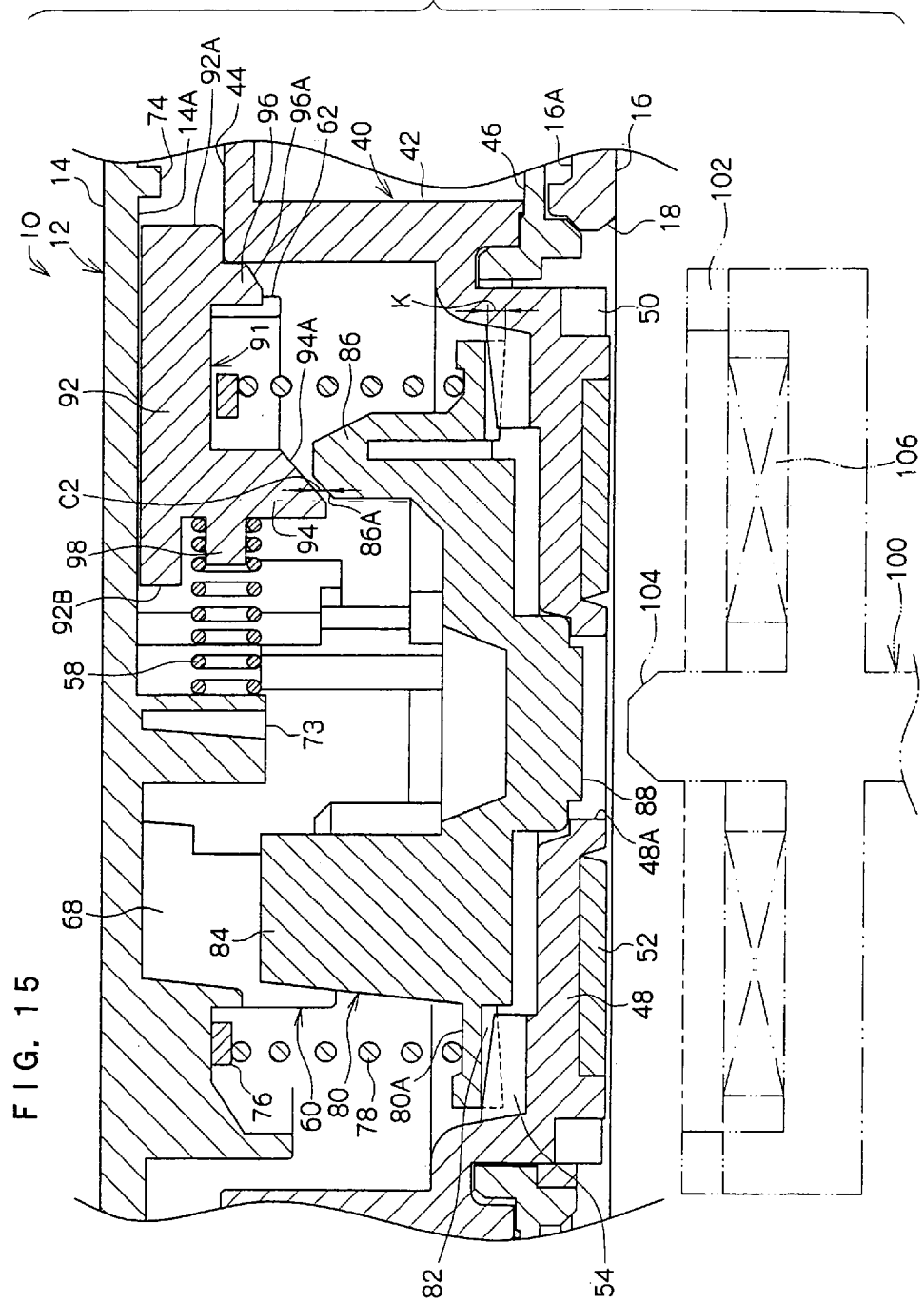
FIG. 15 is a partial enlarged schematic side sectional view of the recording tape cartridge prior to the raising of the rotation shaft.

At a time of non-use of the recording tape cartridge 10 (i.e., when not loaded in a drive device), as shown in FIG. 15, the reel 40 is urged downward by the compression coil spring 78, via the brake member 80. Thus, the braking gear 82 of the brake member 80 is firmly meshed with the engaging gear 54 inside the reel hub 42 by the urging force of the compression coil spring 78, and unintended rotation of the reel 40 is blocked.

The locking members 91 are urged toward the radial direction outer side from the middle of the mounting portion 60 (the middle of the reel 40) by the urging forces of the coil springs 58, and the engagement portions 96 of the locking members 91 engage with the upper edge portion of the reel hub 42. That is, the outer side faces of the engagement portions 96, excluding the taper surfaces 96A, press against the inner peripheral face of the reel hub 42 and the end portions 92A of the main body portions 92, at the radial direction outer side relative to the engagement portions 96, are interposed between the upper face of the upper flange 44 and the inner face of the ceiling plate 14A (i.e., the lower faces of the end portions 92A face the upper face of the upper flange 44 with surface contact or very small separations).

Here, the thickness D of the outer side end portions 92A of the locking members 91 (the main body portions 92) is formed to be substantially equal to the separation W between the inner face of the ceiling plate 14A and the upper face of the upper flange 44 when the reel 40 is disposed at the lowermost position thereof in the case 12. Thus, lifting of the reel 40 is blocked by the locking members 91. That is, even if impact due to falling or the like is applied to the recording tape cartridge 10, the reel 40 will not be lifted. 111 Further, the clearance C2 between the cam portions 94 of the locking members 91 and the engaging protrusions 86 of the brake member 80 is smaller than the meshing amount K of the braking gear 82 with the engaging gear 54, and is extremely narrow. Thus, even if impact due to falling or the like is applied to the recording tape cartridge 10, the brake member 80 will not be substantially lifted. Therefore, problems in which the braking gear 82 does not disengage from the engaging gear 54 but the brake member 80 is inclined and caught up (tipped up) will not occur. Accordingly, the recording tape T will not suffer from adverse effects thereof.

When data is to be recorded at the recording tape T of the recording tape cartridge 10, or data that has been recorded at the recording tape T of the recording tape cartridge 10 is to be replayed, the recording tape cartridge 10 is loaded into a drive device (not shown). That is, the recording tape cartridge 10 is inserted, from the front wall 12A side thereof, at a loading aperture (not shown) of the drive device. Hence, in accordance with this loading, an opening/closing member (not shown) of the drive device moves relatively toward the right end portion of the door 30 (the right side than the support shaft 26), and abuts and pushes against this right end portion.

When the opening/closing member pushes against the right end portion of the door 30, the door 30 rotates about the support shaft 26, against the urging force of the torsion spring 28, and opens up the opening 20. When the door 30 rotates and the opening 20 opens up, a drawing-out member (not shown) of the drive device approaches the opening 20 from the left side wall 12B side thereof, and engages with the hole portion 22A of the leader tape 22. When the drawing-out member that has engaged with the hole portion 22A moves away from the opening 20, the leader tape 22 is drawn out from inside the case 12, and the leader tape 22 is wound round at a winding reel (not shown) of the drive device.

Figure 16:
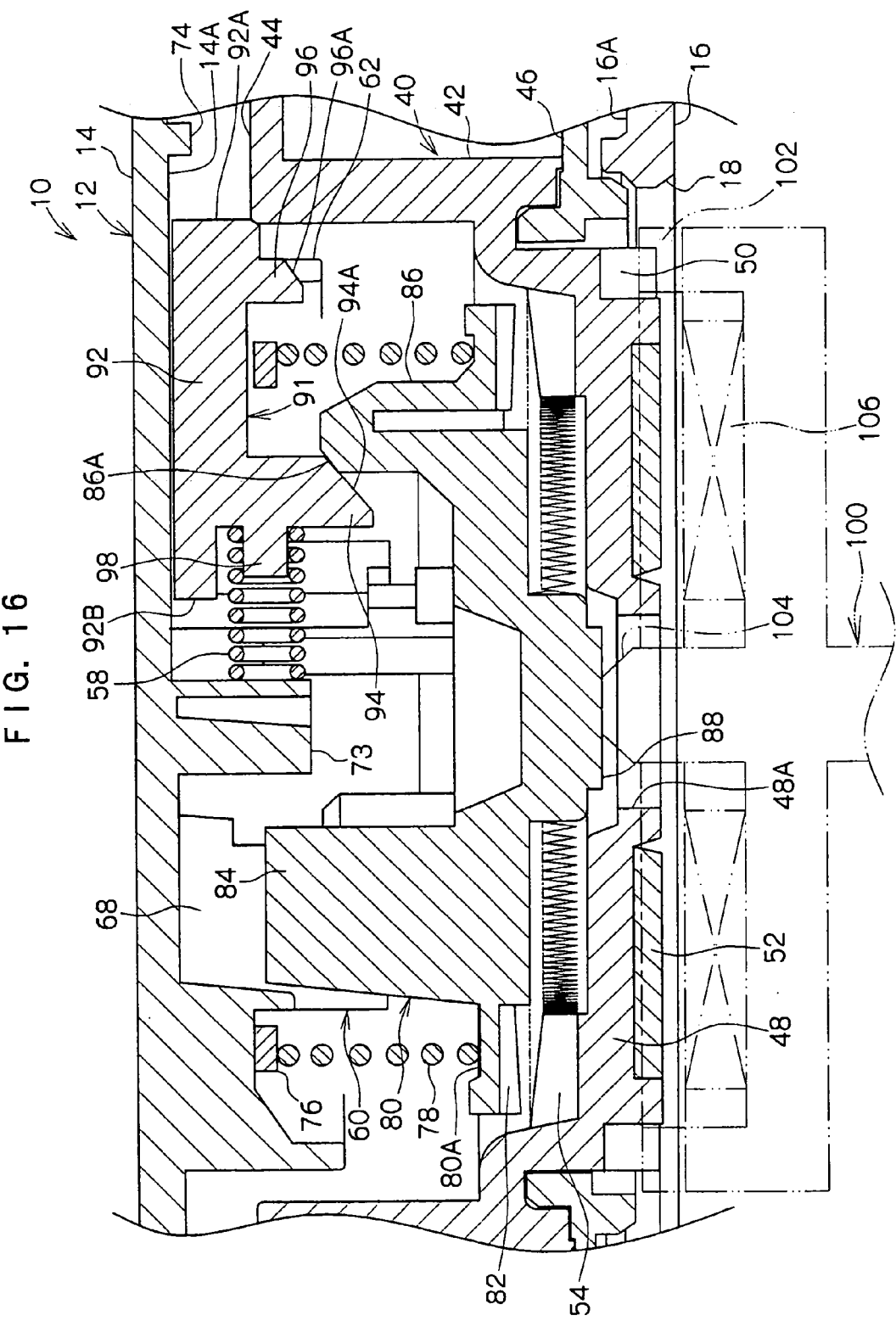
FIG. 16 is a partial enlarged schematic side sectional view of the recording tape cartridge during the raising of the rotation shaft.

Meanwhile, as shown in FIG. 16, the rotation shaft 100 of the drive device advances in through the gear aperture 18 and moves closer to the base wall 48 of the reel 40. Thus, the release protrusion 104 pushes the operation protrusion 88 and lifts up the brake member 80. Correspondingly, the meshing of the engaging gear 54 with the braking gear 82 is released. However, before that, the engaging protrusions 86 abut against the cam portions 94 of the locking members 91, and push the cam portions 94 further upward.

Correspondingly, the taper surfaces 94A of the cam portions 94 slide on the taper surfaces 86A of the engaging protrusions 86, and the locking members 91 slide to the radial direction inner side on the inner face of the ceiling plate 14A (in the accommodation portions 63), against the urging forces of the coil springs 58. At this time, because the recess portions 92C are formed at the main body portions 92, the locking members 91 can slide with little resistance. Further, because of the stopper 76, the locking members 91 can slide in a stable state without disengaging from the accommodation portions 63 (the mounting portion 60).

When the locking members 91 slide to the radial direction inner side in the accommodation portions 63 in this manner, the outer side faces of the engagement portions 96 of the locking members 91 move away from the inner peripheral face of the reel hub 42, and the outer side end portions 92A of the main body portions 92 are withdrawn from between the upper face of the upper flange 44 and the inner face of the ceiling plate 14A (the lower faces of the end portions 92A move away from the upper face of the upper flange 44).

Figure 17:
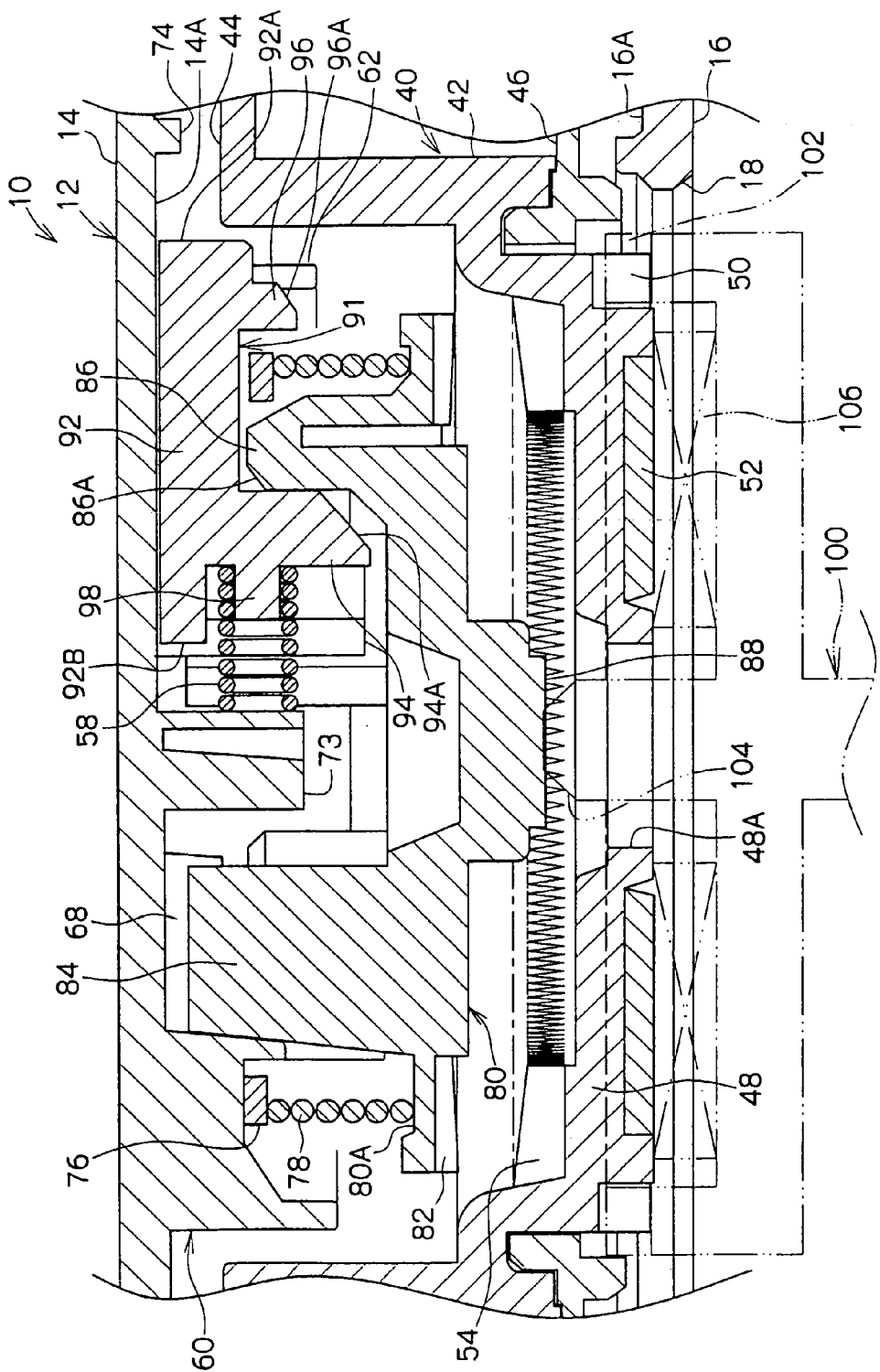
FIG. 17 is a partial enlarged schematic side sectional view of the recording tape cartridge subsequent to the raising of the rotation shaft.

Then, as shown in FIG. 17, when the cam portions 94 pass in (drop in) at the inner sides of the engaging protrusions 86, the outer side end portions 92A of the main body portions 92 are disposed at the inner side of the reel hub 42 and the outer side faces of the cam portions 94 abut against the inner side faces of the engaging protrusions 86. In consequence, the locking members 91 are maintained in an unlocked state and the engagement of the engagement portions 96 with the upper edge portion of the reel hub 42 is released.

Then, when the rotation shaft 100 rises further, the drive gear 102 meshes with the reel gear 50 and the reel plate 52 is attracted by the annular magnet 106. When the drive gear 102 has meshed with the reel gear 50, the reel 40 can be raised to the predetermined height in the case 12 and rotation is possible. When the drive gear 102, and thus the reel 40, is driven to rotate synchronously with the winding reel, the recording tape T is sequentially drawn out to the drive device side, and recording of data to the recording tape T and replaying of data recorded at the recording tape T is implemented by a recording/replaying head (not shown) of the drive device.

Here, the locking members 91 and the brake member 80 abut (contact) only at the outer side faces of the cam portions 94 and the inner side faces of the engaging protrusions 86. Thus, the upper end faces of the engaging protrusions 86, including the taper surfaces 86A, do not abut against (contact) the locking members 91, and the lower end faces of the cam portions 94, including the taper surfaces 94A, do not abut against (contact) the brake member 80. Further, the inner side faces of the engaging protrusions 86 and the outer side faces of the cam portions 94 both have draft angles of 0°.

The draft angles for drawing from dies of outside surfaces of the guide portions 84 and inside surfaces of the guide wall portions 68, which face each other, are greater than or equal to 0.5°, respectively. Further, the clearance between the outside surface of the guide portion 84 at the tip end side thereof and the inside surface of the guide wall portion 68 is larger than or equal to the clearance between the inside surface of the guide wall portion 68 at the tip end side thereof and the outside surface of the guide portion 84, and the maximum clearance is set between 0.05 mm and 0.3 mm.

Further, the pushing forces (urging forces) with which the locking members 91 are pushed by the coil springs 58 are absorbed by the inner periphery faces of the engaging protrusions 86 (i.e., act only in the radial direction of the reel 40), and it does not occur that the brake member 80 (the engaging protrusion 86) is tilted obliquely. Therefore, there is no force that pushes downward against the brake member 80 (i.e., there is no force being transmitted in the axial direction of the reel 40).

Thus, at times of use of the recording tape cartridge 10 (times of rotation of the reel 40), pressing force (urging force) on the brake member 80 is just the urging force of the compression coil spring 78, similarly to the prior art. Therefore, with the structure in which the locking mechanism, meaning the coil springs 58, is provided, there is no problem such that an excess load downward in the axial direction is applied to the rotation shaft 100, and the reel 40 can be stably rotated by the rotation shaft 100.

Subsequently, when the recording tape cartridge 10 is to be taken out from the drive device, first, the drive gear 102 is reverse-rotated and the recording tape T is wound back to the reel 40. Then the leader tape 22 is removed from the winding reel and is returned through the opening 20 into the case 12. That is, the projecting portions 22B of the leader tape 22 are accommodated (inserted) in the accommodating recess portions 24, and are retained at the predetermined positions in the case 12.

Next, the rotation shaft 100 descends, the meshing of the drive gear 102 with the reel gear 50 is released, and the annular magnet 106 is moved away from the reel plate 52. Then the reel 40 is lowered by the urging force of the compression coil spring 78, via the brake member 80. Correspondingly, the locking members 91 are slid to the radial direction outer side in the accommodation portions 63 by the urging forces of the coil springs 58, and the taper surfaces 94A of the cam portions 94 slide on the taper surfaces 86A of the engaging protrusions 86. At this time, because of the stopper 76, the locking members 91 can slide in a stable state without disengaging from the accommodation portions 63 (the mounting portion 60).

Then, when the engaging protrusions 86 move away from the cam portions 94, the engagement portions 96 engage with the upper edge portion of the reel hub 42. That is, the outer side faces of the engagement portions 96, excluding the taper surfaces 96A, are pushed against the inner peripheral face of the reel hub 42 by the urging forces of the coil springs 58, and the outer side end portions 92A of the main body portions 92 are interposed between the upper face of the upper flange 44 and the inner face of the ceiling plate 14A (the lower faces of the end portions 92A oppose the upper face of the upper flange 44 with surface contact or very small separations). Thus, the reel 40 is returned to the state in which lifting thereof is blocked.

Further, at this time, the braking gear 82 is securely meshed with the engaging gear 54 by the urging force of the compression coil spring 78, and inadvertent rotation of the reel 40 is blocked. Then, after the rotation shaft 100 has been taken out through the gear aperture 18, the recording tape cartridge 10 is ejected from the loading aperture. In accordance with this ejection operation, the opening/closing member moves away from the right end portion. Correspondingly, the door 30 is rotated about the support shaft 26 by the urging force of the torsion spring 28, in the opposite direction to the rotation mentioned above, and closes off the opening 20. Thus, the recording tape cartridge 10 whose opening 20 has been closed off is ejected from the drive device.

Figure 19:
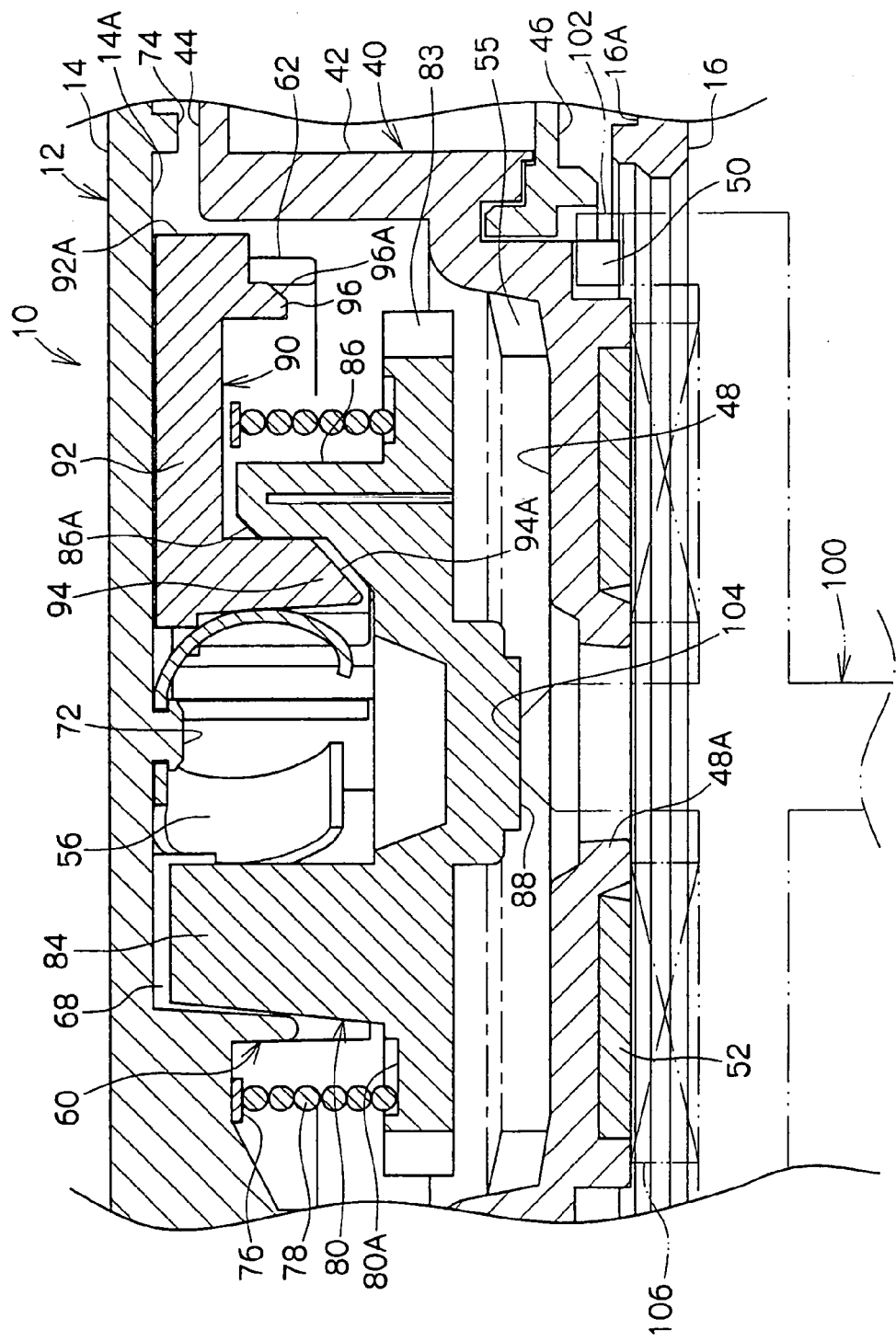
FIG. 19 is a partial enlarged schematic side sectional view of a recording tape cartridge at which the braking gear and an engaging gear are formed as horizontal-type gears, subsequent to raising of a rotation shaft.
Figure 20:
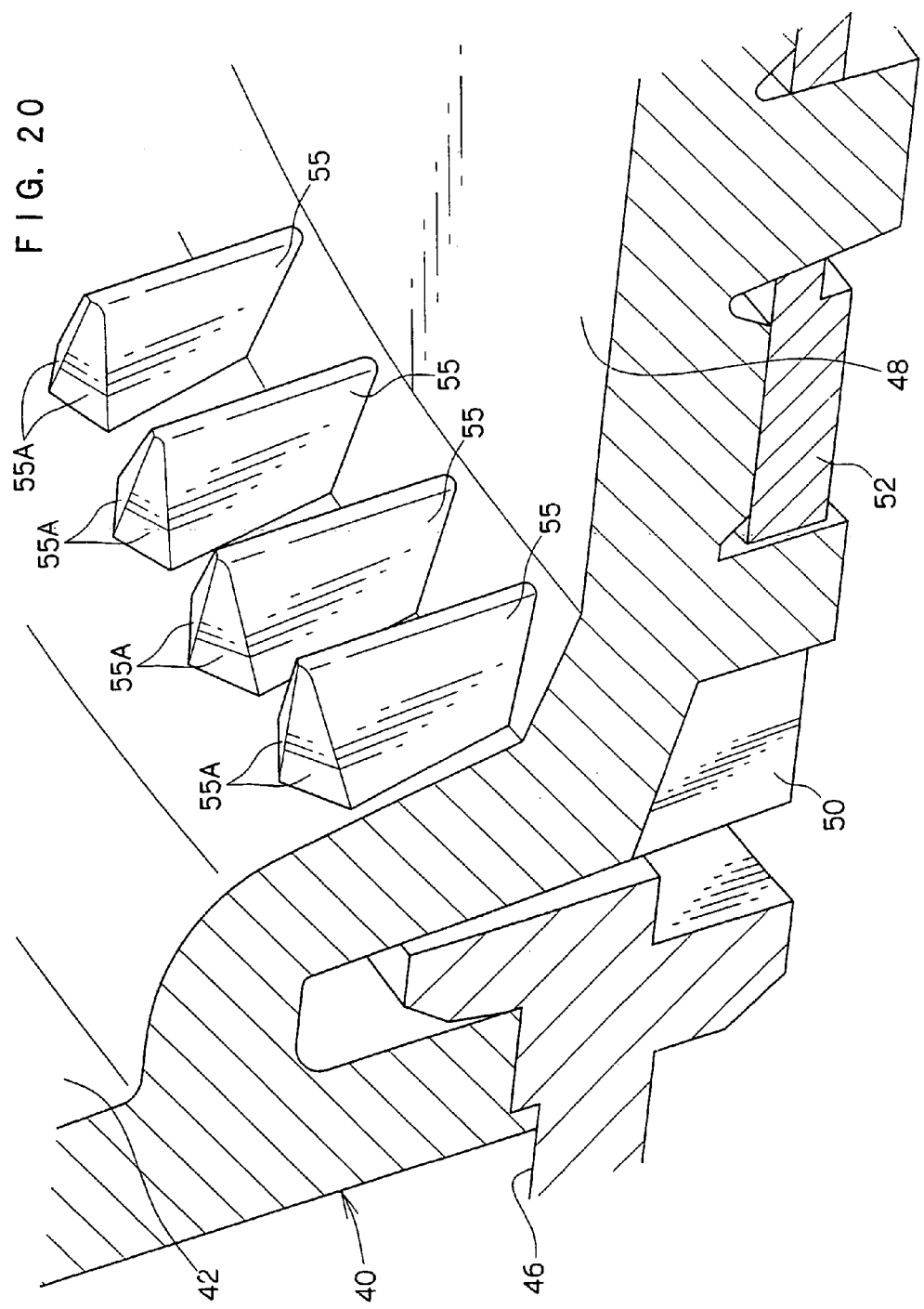
FIG. 20 is a partial enlarged schematic perspective view showing the engaging gear that is formed as a horizontal-type gear.
Figure 21:
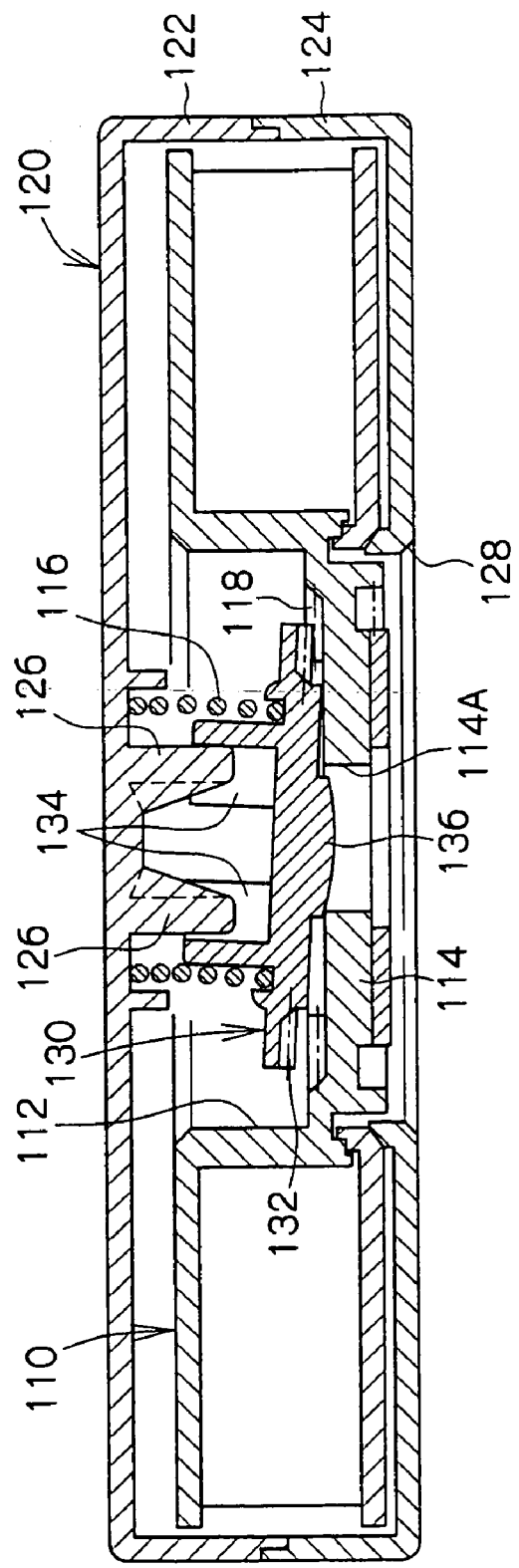
FIG. 21 is a schematic side sectional view of a conventional recording tape cartridge.

Now, in the examples described above, the engaging gear 54 and the braking gear 82 are structured as horizontal-type gears, which oppose and mesh in the vertical direction. However, as shown in FIGS. 18 to 20, a structure with vertical-type gears which oppose and mesh in the radial direction is also possible. Specifically, the gears may be an engaging gear 55 and a braking gear 83. The engaging gear 55 is formed as an inward tooth spur gear whose tooth peaks, which are plurally formed equidistantly at the inner peripheral face of the reel hub 42, are oriented to the middle of the reel hub 42. The braking gear 83 is formed as an outward tooth spur gear whose teeth are plurally formed equidistantly at an outer peripheral face of the brake member 80 and which is meshable with the engaging gear 55 formed as an inward tooth spur gear.

At the engaging gear 55, tooth surfaces that are approximately parallel with radial directions of the teeth are formed to be substantially parallel with the axial direction of the reel 40 (the vertical direction). Both-taper surface 55A (two taper surfaces) is formed at an upper end of each tooth of the engaging gear 55. The both-taper surfaces 55A is formed at each tooth to be symmetrical, about a center line, in a thickness direction of the tooth. The respective both-taper surfaces 55A are used for guidance of the braking gear 83 when the braking gear 83 is moving downward in the axial direction of the reel 40. At the brake member 80 too, tooth surfaces that are approximately parallel with the radial directions of the teeth are formed to be substantially parallel with the axial direction of the reel 40 (the vertical direction).

When such horizontal-type gears are utilized, even if forcible rotation of the reel 40 is attempted in a rotation-locked state of the reel 40, no portion of this rotation force will be converted by the meshing surfaces of the braking gear 83 and the engaging gear 55 to a movement force for moving the brake member 80 toward a rotation-allowing position. Therefore, the meshing of the braking gear 83 with the engaging gear 55 will not be released. In other words, undesirable rotation of the reel 40 is reliably blocked.

Further, even if an impact is applied to the recording tape cartridge 10 by a fall or the like and a situation in which the brake member 80 which is accommodated thereinside is shaken in the vertical direction (the axial direction of the reel 40) occurs, there is no change in circumferential direction backlash of the braking gear 83 and the engaging gear 55 in this movement of the brake member 80 in the vertical direction (the axial direction of the reel 40). Therefore, provided displacement of the brake member 80 is within a range of tooth heights (heights in the axial direction of the reel 40) from a rotation-locking position toward a rotation-enabling position, inadvertent rotation of the reel 40 will be blocked.

Anyway, in the examples described above, the plate spring 56 and the coil springs 58 have been employed as examples and described as serving as the urging member for urging the locking members away from the middle of the reel 40 (the mounting portion 60) toward the radial direction outer side. However, the urging member is not limited thus, and could be structured by, for example, torsion springs or the like.

Furthermore, in the examples described above, structures which slide the locking members 90 or 91 in the radial directions by engagement with the brake member 80 have been used. However, structures for sliding the locking members 90 or 91 in the radial direction are not limited thus. For example, a structure which provides a switching member or the like separately from the brake member 80, for switching the locking members 90 or 91 between an ascent/descent-locking position (a position which blocks movement in the axial direction of the reel 40) and an ascent/descent-allowing position (a position which allows movement in the axial direction of the reel 40), is also possible. However, in such a case, this switching member or the like preferably has a structure which operates interlockingly with the brake member 80.

Further, in the aspects of the present invention, it is possible that the switching member of the aspect is a brake member which is provided to be non-rotatable with respect to the case and which is capable of positioning at a rotation-locking position, at which the brake member engages with the reel for blocking rotation of the reel, and a rotation-allowing position, at which the engagement with the reel is released for allowing rotation of the reel.

The switching member is provided to be non-rotatable with respect to the case and the switching member puts the brake member at the rotation-locking position, at which the brake member engages with the reel and prevents rotation of the reel, and the rotation-allowing position, at which the engagement with the reel is released and rotation of the reel is enabled. That is, at the vertical movement-allowing position, the locking member is abutted against the brake member, by the urging force of the urging member, only in the radial direction of the reel. Consequently, the urging force from this urging member will not become a force that pushes against the brake member in the axial direction of the reel. Therefore, at times of rotation of the reel, the problem in which the loading on the rotation shaft of the drive device (the loading in the axial direction of the reel) is increased will not occur. In consequence, the reel can be stably rotated.

What is claimed is:

1. A recording tape cartridge comprising:
   a case accommodating a reel on which a recording tape is wound;
   a mounting portion formed at an inner face of a ceiling plate of the case, at which sets of two of the guide wall portions are provided in protruding manner;
   a locking member provided to be slideable in a radial direction of the reel at the mounting portion, the locking member being capable of positioning at a vertical movement-locking position, at which the locking member is interposed between an upper face of the reel and the ceiling plate for blocking movement of the reel in an axial direction of the reel, and a vertical movement-allowing position, at which the locking member is withdrawn from between the upper face of the reel and the ceiling plate for allowing movement of the reel in the axial direction;

a switching member which is moved in the axial direction of the reel by a rotation shaft of a drive device, for switching the locking member between the vertical movement-locking position and the vertical movement-allowing position;

guide portions provided in protruding manner at the switching member, each of the guide portions being inserted between the respective guide wall portions so as to guide movement of the switching member;

an urging member which urges the locking member in the radial direction of the reel; and a disengagement prevention member which retains the locking member such that the locking member does not disengage from the mounting portion, wherein draft angles for removing from dies, of surfaces of the guide portions and surfaces of the guide wall portions, which face each other, are greater than or equal to 0.5°, respectively, and at the vertical movement-allowing position, a clearance between an outside surface of the guide portion at a tip end side thereof and an inside surface of the guide wall portion is larger than or equal to a clearance between the inside surface of the guide wall portion at a tip end side thereof and the outside surface of the guide portion, and the maximum clearance between the outside surface of the guide portion and the inside surface of the guide wall portion is set between 0.05 mm and 0.3 mm, and the locking member contacting the switching member only in the radial direction of the reel by the urging member.

2. The recording tape cartridge of claim 1, wherein the switching member is a brake member which is provided to be non-rotatable with respect to the case and which is capable of positioning at a rotation-locking position, at which the brake member engages with the reel for blocking rotation of the reel, and a rotation-allowing position, at which the engagement with the reel is released for allowing rotation of the reel.

3. A recording tape cartridge comprising:

a case accommodating a reel on which a recording tape is wound;

a mounting portion formed at an inner face of a ceiling plate of the case, at which sets of two of the guide wall portions are provided in protruding manner;

a locking member provided to be slideable in a radial direction of the reel at the mounting portion, the locking member being capable of positioning at a vertical movement-locking position for blocking movement of the reel in an axial direction of the reel and a vertical movement-allowing position for allowing movement of the reel in the axial direction, a cam portion being formed at a position which is in a vicinity of an inner end, in the radial direction of the reel, of the locking member;

a switching member which is moved in the axial direction of the reel by a rotation shaft of a drive device, for switching the locking member between the vertical movement-locking position and the vertical movement-allowing position, a protrusion being formed at an upper surface of the switching member;

guide portions provided in protruding manner at the switching member, each of the guide portions being inserted between the respective guide wall portions so as to guide movement of the switching member;

an urging member which abuts against and pushes outwardly in the radial direction of the reel an inner side face, in the radial direction of the reel, of the cam portion so as to urge the locking member; and a disengagement prevention member which retains the locking member such that the locking member does not disengage from the mounting portion, wherein, draft angles for removing from dies, of surfaces of the guide portions and surfaces of the guide wall portions, which face each other, are greater than or equal to 0.5°, respectively, and at the vertical movement-allowing position, a clearance between an outside surface of the guide portion at a tip end side thereof and an inside surface of the guide wall portion is larger than or equal to a clearance between the inside surface of the guide wall portion at a tip end side thereof and the outside surface of the guide portion, and the maximum clearance between the outside surface of the guide portion and the inside surface of the guide wall portion is set between 0.05 mm and 0.3 mm, and the locking member is capable of positioning at the vertical movement-locking position, at which an outer end, in the radial direction of the reel, of the locking member is interposed between an upper face of the reel and the ceiling plate, and at the vertical movement-allowing position, at which the outer end, in the radial direction of the reel, of the locking member is withdrawn from between the upper face of the reel and the ceiling plate and the cam portion is moved inward, in the radial direction of the reel, with respect to the protrusion, and when the locking member is at the vertical movement-allowing position, an outer side face, in the radial direction of the reel, of the cam portion abuts against an inner side face, in the radial direction of the reel, of the protrusion only in the radial direction of the reel.

4. The recording tape cartridge of claim 3, wherein the switching member is a brake member which is provided to be non-rotatable with respect to the case and which is capable of positioning at a rotation-locking position, at which the brake member engages with the reel for blocking rotation of the reel, and a rotation-allowing position, at which the engagement with the reel is released for allowing rotation of the reel.

* * * * *